US012202223B2

(12) United States Patent
Provoost et al.

(10) Patent No.: US 12,202,223 B2
(45) Date of Patent: Jan. 21, 2025

(54) PACKAGING MACHINE INFEED, SEPARATION, AND CREASING MECHANISMS

(71) Applicant: Avercon BVBA, Eeklo (BE)

(72) Inventors: David Michel Provoost, Oudenaarde (BE); Herman Germain De Dycker, Wichelen (BE); Dimitri Daniel Raphaël Van Steenkiste, Wingene (BE); Stefaan Albert Marie-Louise Hamerlinck, Watervliet (BE)

(73) Assignee: AVERCON BVBA, Eeklo (BE)

( * ) Notice: Subject to any disclaimer, the term of this patent is extended or adjusted under 35 U.S.C. 154(b) by 0 days.

(21) Appl. No.: 18/435,110

(22) Filed: Feb. 7, 2024

(65) Prior Publication Data

US 2024/0181736 A1 Jun. 6, 2024

Related U.S. Application Data

(60) Continuation of application No. 18/309,043, filed on Apr. 28, 2023, now Pat. No. 12,023,887, which is a (Continued)

(30) Foreign Application Priority Data

Apr. 5, 2018 (BE) ................................ 2018/05232
Apr. 5, 2018 (BE) ................................ 2018/05233
Oct. 10, 2018 (BE) ................................ 2018/05697

(51) Int. Cl.
*B31B 50/00* (2017.01)
*B26D 7/00* (2006.01)
(Continued)

(52) U.S. Cl.
CPC .......... *B31B 50/044* (2017.08); *B26D 7/0006* (2013.01); *B26D 7/26* (2013.01);
(Continued)

(58) Field of Classification Search
CPC ...... B26D 2001/0053; B26D 2001/006; B31B 50/83; B31B 50/146; B65B 5/024; B65B 2210/04
See application file for complete search history.

(56) References Cited

U.S. PATENT DOCUMENTS 3,218,940 A * 11/1965 Pearson .................. B31B 50/46
118/DIG. 3
5,024,641 A * 6/1991 Boisseau ................ B31B 50/44
493/143

(Continued)

*Primary Examiner* — Eyamindae C Jallow
(74) *Attorney, Agent, or Firm* — Quarles & Brady LLP

(57) ABSTRACT

A machine for forming packing templates includes a infeed mechanism that can feed multiple feeds of sheet material into the machine without repositioning the infeed mechanism or forming creases or bends in the sheet material. The machine also includes a separation and cutting systems with one or more cutting tables and biased knives that cut the sheet material packaging templates. The machine also includes creasing roller(s) that forms creases in the sheet material. The machine also includes a system for reducing or eliminating the impact of irregularities in the sheet material.

18 Claims, 8 Drawing Sheets

Related U.S. Application Data continuation of application No. 17/401,799, filed on Aug. 13, 2021, now Pat. No. 11,667,096, which is a division of application No. 16/375,579, filed on Apr. 4, 2019, now Pat. No. 11,247,427.

(60) Provisional application No. 62/729,762, filed on Sep. 11, 2018.

(51) Int. Cl.

| | |
|---|---|
| ***B26D 7/26*** | (2006.01) |
| ***B31B 50/04*** | (2017.01) |
| ***B31B 50/20*** | (2017.01) |
| ***B31B 50/56*** | (2017.01) |
| ***B65B 43/24*** | (2006.01) |
| ***B65B 43/52*** | (2006.01) |

(52) U.S. Cl.
CPC ............ *B31B 50/042* (2017.08); *B31B 50/20* (2017.08); *B31B 50/56* (2017.08); *B65B 43/24* (2013.01); *B65B 43/52* (2013.01); *B26D 2007/0012* (2013.01)

(56) References Cited

U.S. PATENT DOCUMENTS

| | | | | |
|---|---|---|---|---|
| 9,027,515 | B2 * | 5/2015 | Fidrych | A01K 27/00 119/858 |
| 9,771,231 | B2 * | 9/2017 | Pettersson | B65H 16/00 |
| 2008/0020916 | A1 * | 1/2008 | Magnell | G01B 11/00 700/112 |
| 2013/0108408 | A1 * | 5/2013 | Saison | B65H 3/0816 414/797 |
| 2017/0057190 | A1 * | 3/2017 | Toro | B31B 50/16 |
| 2017/0361561 | A1 * | 12/2017 | Lee | B31B 50/26 |

* cited by examiner

PACKAGING MACHINE INFEED, SEPARATION, AND CREASING MECHANISMS

CROSS-REFERENCE TO RELATED APPLICATIONS

This application is a continuation of U.S. patent application Ser. No. 18/309,043, filed Apr. 28, 2023, and entitled "Packaging Machine Infeed, Separation, and Creasing Mechanisms," which is a continuation of U.S. patent application Ser. No. 17/401,799, filed Aug. 13, 2021, and entitled "Packaging Machine Infeed, Separation, and Creasing Mechanisms," now U.S. Pat. No. 11,667,096, issued Jun. 6, 2023, which is a divisional of U.S. patent application Ser. No. 16/375,579, filed Apr. 4, 2019, and entitled "Packaging Machine Infeed, Separation, and Creasing Mechanisms," now U.S. Pat. No. 11,247,427, issued Feb. 15, 2022, which claims priority to and the benefit of: U.S. Patent Application Ser. No. 62/729,762, filed Sep. 11, 2018, and entitled "Packaging Machine Infeed, Separation, and Creasing Mechanisms"; Belgian Patent Application No. 2018/05697, filed Oct. 10, 2018, and entitled "Packaging Machine Infeed, Separation and Creasing Mechanisms"; Belgian Patent Application No. 2018/05233, filed Apr. 5, 2018, and entitled "Spring-Mounted Blades"; and Belgian Patent Application No. 2018/05232, filed Apr. 5, 2018, and entitled "Cutting Out False Creases", the disclosures of which are incorporated herein by this reference in their entireties.

BACKGROUND

1. Technical Field

Exemplary embodiments of the disclosure relate to systems, methods, and devices for packaging items into boxes. More specifically, exemplary embodiments relate to packaging machine mechanisms that feed sheet material into the packaging machine, separate the sheet material into lengths used to create packaging templates, and form cuts and creases in the sheet material to form packaging templates therefrom.

2. The Relevant Technology

Shipping and packaging industries frequently use paperboard and other sheet material processing equipment that converts sheet materials into box templates. One advantage of such equipment is that a shipper may prepare boxes of required sizes as needed in lieu of keeping a stock of standard, pre-made boxes of various sizes. Consequently, the shipper can eliminate the need to forecast its requirements for particular box sizes as well as to store pre-made boxes of standard sizes. Instead, the shipper may store one or more bales of fanfold material, which can be used to generate a variety of box sizes based on the specific box size requirements at the time of each shipment. This allows the shipper to reduce storage space normally required for periodically used shipping supplies as well as reduce the waste and costs associated with the inherently inaccurate process of forecasting box size requirements, as the items shipped and their respective dimensions vary from time to time.

In addition to reducing the inefficiencies associated with storing pre-made boxes of numerous sizes, creating custom sized boxes also reduces packaging and shipping costs. In the fulfillment industry it is estimated that shipped items are typically packaged in boxes that are about 65% larger than the shipped items. Boxes that are too large for a particular item are more expensive than a box that is custom sized for the item due to the cost of the excess material used to make the larger box. When an item is packaged in an oversized box, filling material (e.g., Styrofoam, foam peanuts, paper, air pillows, etc.) is often placed in the box to prevent the item from moving inside the box and to prevent the box from caving in when pressure is applied (e.g., when boxes are taped closed or stacked). These filling materials further increase the cost associated with packing an item in an oversized box.

Customized sized boxes also reduce the shipping costs associated with shipping items compared to shipping the items in oversized boxes. A shipping vehicle filled with boxes that are 65% larger than the packaged items is much less cost efficient to operate than a shipping vehicle filled with boxes that are custom sized to fit the packaged items. In other words, a shipping vehicle filled with custom sized packages can carry a significantly larger number of packages, which can reduce the number of shipping vehicles required to ship the same number of items. Accordingly, in addition or as an alternative to calculating shipping prices based on the weight of a package, shipping prices are often affected by the size of the shipped package. Thus, reducing the size of an item's package can reduce the price of shipping the item. Even when shipping prices are not calculated based on the size of the packages (e.g., only on the weight of the packages), using custom sized packages can reduce the shipping costs because the smaller, custom sized packages will weigh less than oversized packages due to using less packaging and filling material.

Although sheet material processing machines and related equipment can potentially alleviate the inconveniences associated with stocking standard sized shipping supplies and reduce the amount of space required for storing such shipping supplies, previously available machines and associated equipment have various drawbacks. For instance, previous systems have focuses primarily on the creation of boxes and sealing the boxes once they are filled. Such systems have required the use of multiple separate machines and significant manual labor. For instance, a typical box forming system includes a converting machine that cuts, scores, and/or creases sheet material to form a box template. Once the template is formed, an operator removes the template from the converting machine and a manufacturer's joint is created in the template. A manufacturer's joint is where two opposing ends of the template are attached to one another. This can be accomplished manually and/or with additional machinery. For instance, an operator can apply glue (e.g., with a glue gun) to one end of the template and can fold the template to join the opposing ends together with the glue therebetween. Alternatively, the operator can at least partially fold the template and insert the template into a gluing machine that applies glue to one end of the template and joins the two opposing ends together. In either case, significant operator involvement is required. Additionally, using a separate gluing machine complicates the system and can significantly increase the size of the overall system.

Once the manufacturer's joint is created, the template can be partially erected and bottom flaps of the template can be folded and secured to form a bottom surface of a box. Again, an operator typically has to erect the box. The bottom flaps can be folded and secured manually by the operator or with the assistance of yet additional machines. Thereafter, an operator transfers the to-be-packaged item(s) into the box and the top flaps are folded and secured.

While some efforts have been made to create individual packaging machines that create packaging templates and erect and seal the packaging template around the to-be-packaged item(s), there remains room for improvement in the area of packaging machines and related methods.

BRIEF SUMMARY

Exemplary embodiments of the disclosure relate to systems, methods, and devices for packaging items into boxes. More specifically, exemplary embodiments relate to packaging machine mechanisms that feed sheet material into the packaging machine, separate the sheet material into lengths used to create packaging templates, and form creases and cuts in the sheet material to form packaging templates therefrom.

For instance, one embodiment of a packaging machine used to convert generally rigid sheet material into packaging templates for assembly into boxes or other packaging includes an infeed mechanism. The infeed mechanism directs a first feed of the sheet material and a second feed of the sheet material into the packaging machine. The infeed mechanism includes a first low friction surface and an associated first advancement mechanism. The first advancement mechanism is configured to engage and advance the first feed of the sheet material along the first low friction surface and into the packaging machine. A second low friction surface and an associated second advancement mechanism are also included. The second advancement mechanism is configured to engage and advance the second feed of the sheet material along the second low friction surface and into the packaging machine. The first low friction surface and the second low friction surface form an acute angle that is configured to enable the sheet material to be advanced into the packaging machine without creating any folds or creases in the sheet material. The converting machine also includes one or more converting tools configured to perform one or more conversion functions on the sheet material as the sheet material moves through the packaging machine, the one or more conversion functions being selected from the group consisting of creasing, bending, folding, perforating, cutting, and scoring, to create the packaging templates.

According to another embodiment, a packaging machine used to convert generally rigid sheet material into packaging templates for assembly into boxes or other packaging includes a separation system that separates the sheet material into lengths for use in creating the packaging templates. The separation system includes a cutting table having a cutting edge, a first knife, and a second knife. The first knife has a mounted end, a free end, and a first knife edge extending at least partially therebtween. The first knife edge is angled relative to the cutting edge of the cutting table to create a contact point between the first knife edge and the cutting edge of the cutting table when the first knife is moved between a raised position to a lowered position. The second knife has a mounted end, a free end, and a second knife edge extending at least partially therebetween. The second knife edge is angled relative to the cutting edge of the cutting table to create a contact point between the second knife edge and the cutting edge of the cutting table when the second knife is moved between a raised position to a lowered position. The free ends of the first and second knives are positioned adjacent to one another near a center of the sheet material. The mounted ends of the first and second knives are positioned adjacent to opposing sides of the sheet material.

According to another embodiment, a packaging machine used to convert generally rigid sheet material into packaging templates for assembly into boxes or other packaging includes a creasing system that forms transverse creases in the sheet material. The transverse creases are oriented across the sheet material and transverse to the length of the sheet material. The creasing system includes a support plate that supports the sheet material, a first creasing roller, and a second creasing roller. The first creasing roller is oriented across the sheet material and transverse to the length of the sheet material. The first creasing roller has a first creasing ridge extending radially therefrom. The first creasing roller is configured to rotate to engage the first creasing ridge with the sheet material to form a crease in the sheet material. The second creasing roller is oriented across the sheet material and transverse to the length of the sheet material. The second creasing roller has a second creasing ridge extending radially therefrom. The second creasing roller is configured to rotate to engage the second creasing ridge with the sheet material to form a crease in the sheet material. The first and second creasing rollers are positioned adjacent to one another and are independently operable.

In another embodiment, a cutting unit for cutting sheet material includes a cutting table with a first cutting edge and a blade with a second cutting edge. The cutting unit also includes a first actuator mounted between the cutting table and the blade for moving the blade relative to the cutting table in an up and downward cutting movement. The first and the second cutting edges lie at an angle so that a contact point can be identified between the first and the second cutting edges during the cutting movement. A pressure element is provided to exert a force on the blade to increase a pressure between the first cutting edge and the second cutting edge at the position of the contact point.

In another embodiment, a method is provided for cutting sheet material with a cutting unit that includes a cutting table with a first cutting edge and a blade with a second cutting edge. The first cutting edge and the second cutting edge lie at an angle. The method includes moving the blade relative to the cutting table in an up and downward (linear) cutting movement by means of a first actuator and pressing on the blade by means of a pressure element during the cutting movement in order to increase a pressure between the first cutting edge and the second cutting edge at the position of a contact point.

In another embodiment, a device for making box templates from a continuous length of sheet material includes a supply of sheet material, a cutting device, a controller, and a sensor. The supply is configured to supply the continuous length of sheet material to the cutting device. The cutting device is configured to cut the continuous length of sheet material into successive segments on the basis of input from the controller in order to make the box templates. The sensor is configured to detect an irregularity in the continuous length of sheet material and to transmit a position of the irregularity to the controller. The controller is provided to activate a discharge cycle in the cutting device on the basis of the position of a waste segment in the continuous length of sheet material. The discharge cycle is configured to cause the waste segment to be cut from the continuous length and discharged.

In yet another embodiment, a method for creating box templates from a continuous length of sheet material is provided. The method includes supplying the continuous length of sheet material to a cutting device. The method also includes cutting the continuous length of sheet material into successive segments with the cutting device on the basis of an input from a controller in order to make the box templates. The method further includes detecting an irregularity at a position in the continuous length of sheet material via a sensor and transmitting the position to the controller. The method also includes activating a discharge cycle in the cutting device on the basis of the position of the irregularity, cutting a waste segment out of the continuous length, and discharging the waste segment from the cutting device.

These and other objects and features of the present disclosure will become more fully apparent from the following description and appended claims, or may be learned by the practice of the disclosure as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The embodiments described herein generally relate to systems, methods, and devices for packaging item(s) into boxes. More specifically, the described embodiments relate to packaging machine mechanisms that feed sheet material into the packaging machine, separate the sheet material into lengths used to create packaging templates, and form cuts and creases in the sheet material to form packaging templates therefrom.

While the present disclosure will be described in detail with reference to specific configurations, the descriptions are illustrative and are not to be construed as limiting the scope of the present disclosure. Various modifications can be made to the illustrated configurations without departing from the spirit and scope of the invention as defined by the claims. For better understanding, like components have been designated by like reference numbers throughout the various accompanying figures.

Throughout the description and claims, components are described as being in specific orientations or relative positions. Such descriptions are used merely for the sake of convenience and are not intended to limit the invention. For instance, a component may be described as being above or below another component. It will be appreciated, however, that the machines, system, and mechanisms may be oriented in other ways in some embodiments. As a result, a component that is described as being above another component may be positioned below or to the side of the other component in some embodiments. In some cases, a component that is described as being positioned "above" or "below" another component may be understood to be positioned on one side or another of sheet material that is being converted into packaging templates.

As used herein, the terms "box template" and "blank" are used interchangeably and refer to a substantially flat material that can be folded into a box-like shape. Box templates may be made from a stock of sheet material (e.g., paperboard, corrugated board, cardboard, etc.). In some cases, the sheet material is a fanfold material that has been folded back and forth on itself to form a bail. A box template may have notches, cutouts, divides, and/or creases that allow the box template to be bent and/or folded into a box. Additionally, a box template may be made of any suitable material, generally known to those skilled in the art. For example, cardboard or corrugated paperboard may be used as the box template material. A suitable material also may have any thickness and weight that would permit it to be bent and/or folded into a box-like shape.

Figure 1:
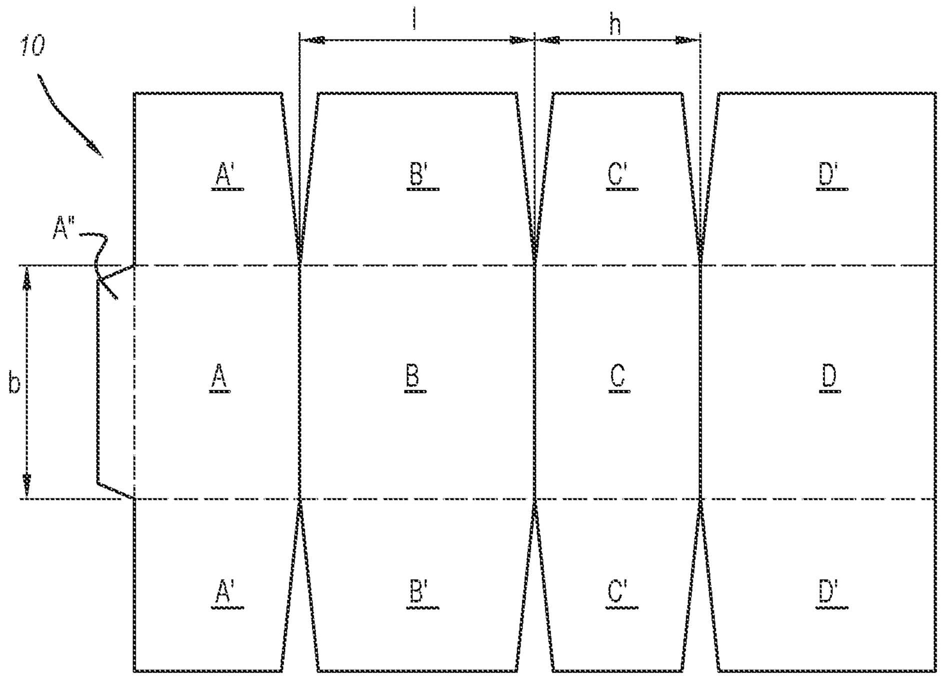
FIG. 1 illustrate an example box template.

FIG. 1 illustrates one example embodiment of a packaging template 10. The packaging template 10 includes cuts (shown in solid lines) and creases (shown in dashed lines). As used herein, a crease can be an impression in the sheet material that facilitates folding of the packaging template 10 at the location of the impression. Alternatively, a crease can also be a partial incision or score, in which the sheet material is only partially cut through its full thickness, such that a weakening of the sheet material occurs at the location of the partial cut or score.

The packaging template 10 includes four central panels A, B, C, and D. Each of the four central panels is provided to form a wall of a box. In the configuration from FIG. 1, the panel B forms the bottom wall of the box, panels A and C form upright walls of the box, and panel D forms the top wall of the box. FIG. 1 also shows how the length 1, width b, and height h of the box result from the dimensions of the packaging template 10. Each of the panels A, B, C, and D has two side flaps, which are indicated by A', B', C', and D', respectively. These side flaps are provided to form the two side walls of the box. Further, in the present embodiment, a glue flap A" extends from panel A. The glue flap A" serves to connect panel A to panel D when forming the box.

In FIG. 1, a wedge-shaped piece of material has been cut away between adjacent side flaps. This may be advantageous in some cases in the folding of the side flaps. Nevertheless, in other embodiments, a box template may be formed in which the adjacent side flaps are separated from each other by a single cut rather than multiple cuts to remove a wedge of material. For example, the side flaps in box template 10 can be formed by a straight cut in the transverse direction of box template 10, starting at an edge of the blank and extending toward a central axis of the box template over a length equal to the length of the side flaps.

It will also be appreciated that the side flaps A', B', C' and D' can be dimensioned to fully form or partially form the side panels. When the side panel has been only partially formed, the side panels will typically have an opening in the center, whereby the box is not fully closed. This is advantageous in some situations. When the side panel has been fully formed, the side flaps can be adjoining or overlapping. Different combinations hereof are also possible. It will also be understood how a box template 10 can be created to form a box with predetermined dimensions.

Reference to box template 10 will be made through the description. It will be understood, however, that box template 10 is merely one example box template that may be created with the embodiments disclosed herein. Thus, the specific configuration (e.g., number of panels/flaps, proportions, placement of cuts/creases, etc.) of a box template is not limited to that shown in FIG. 1.

Figure 2:
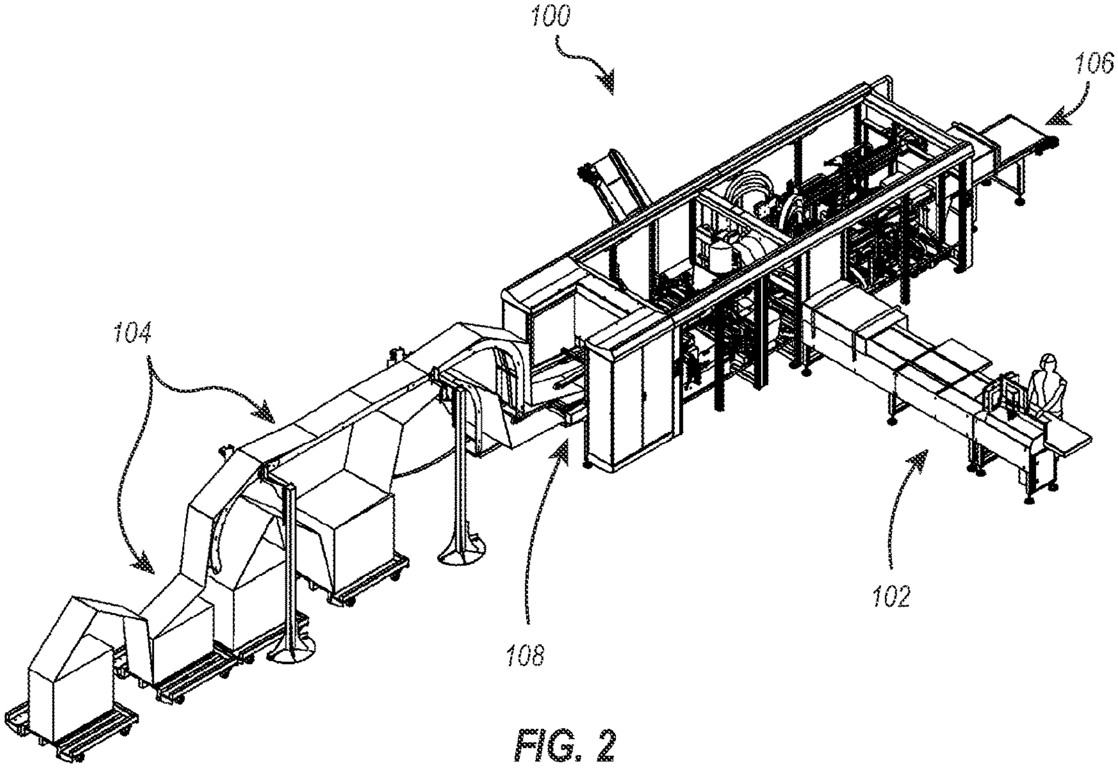
FIG. 2 illustrates an example packaging machine used to package items.

Attention is now directed to FIG. 2, which illustrates an example packaging machine 100 used to create and erect packaging templates around to-be-packaged item(s). In the illustrated embodiment, item(s) for packaging are delivered to the machine 100 via conveyor 102. The dimensions of the item(s) may be obtained while the item(s) is/are positioned on the conveyor 102 or before.

In any event, the item(s) is/are advanced into the packaging machine 100 on conveyor 102. The packaging machine 100 creates a box template custom sized for the item(s) from sheet material 104. The packaging machine 100 also folds and secures the box template around the item(s). The packaged item(s) is/are then advanced out of the packaging machine 100 on another conveyor 106.

Infeed Mechanism

One common challenge with packaging machines is feeding the sheet material into the machine. For instance, the infeed mechanisms of some packaging machines create folds or creases in the sheet material as the sheet material is fed into the packaging machine. The folds or creases can pose problems as the sheet material advances through the packaging machine. By way of example, the folds or creases can cause the packaging material to get caught or jammed in the packaging machine. The folds or creases can also cause the packaging machine to form desired creases and/or cuts in the sheet material at undesired locations in the sheet material.

In the illustrated embodiment, the packaging machine 100 includes an infeed mechanism 108 that is designed to feed multiple streams or feeds of sheet material into the packaging machine 100 without creating undesired folds or creases in the sheet material. Additionally, the infeed mechanism 108 does not require a cassette changer that moves up or down in order to feed sheet material from different streams of sheet material into the packaging machine 100.

Figure 3:
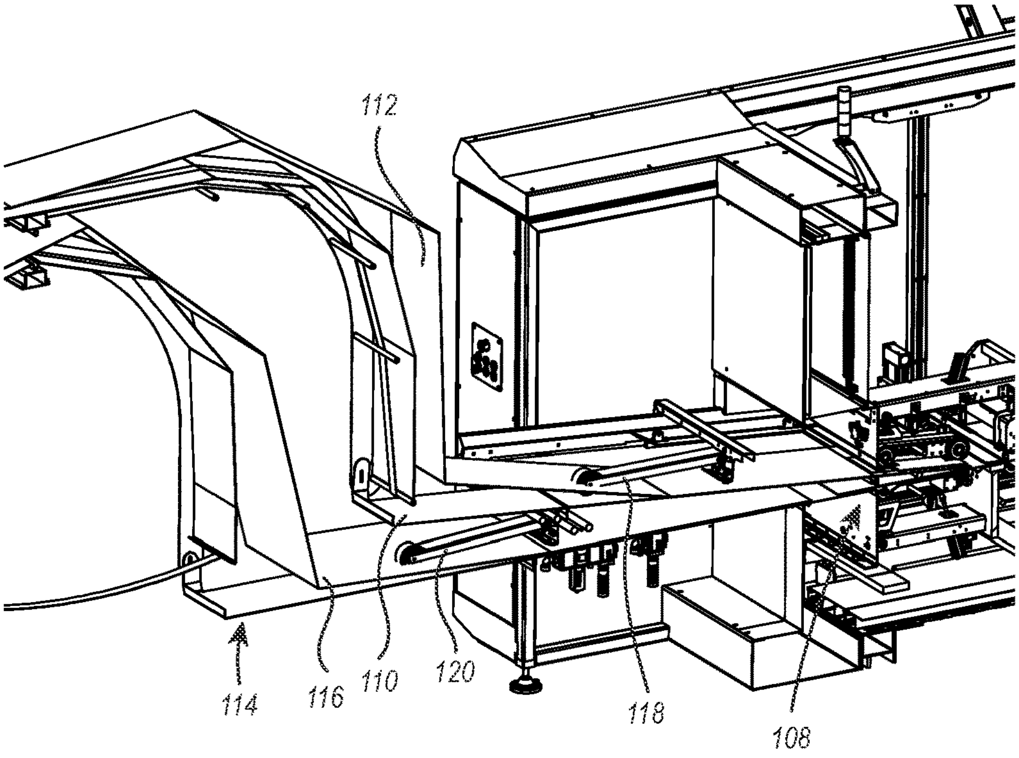
FIGS. 3-5 illustrate various cross-sectional views of an infeed mechanism of the packaging machine of FIG. 2.
Figure 4:
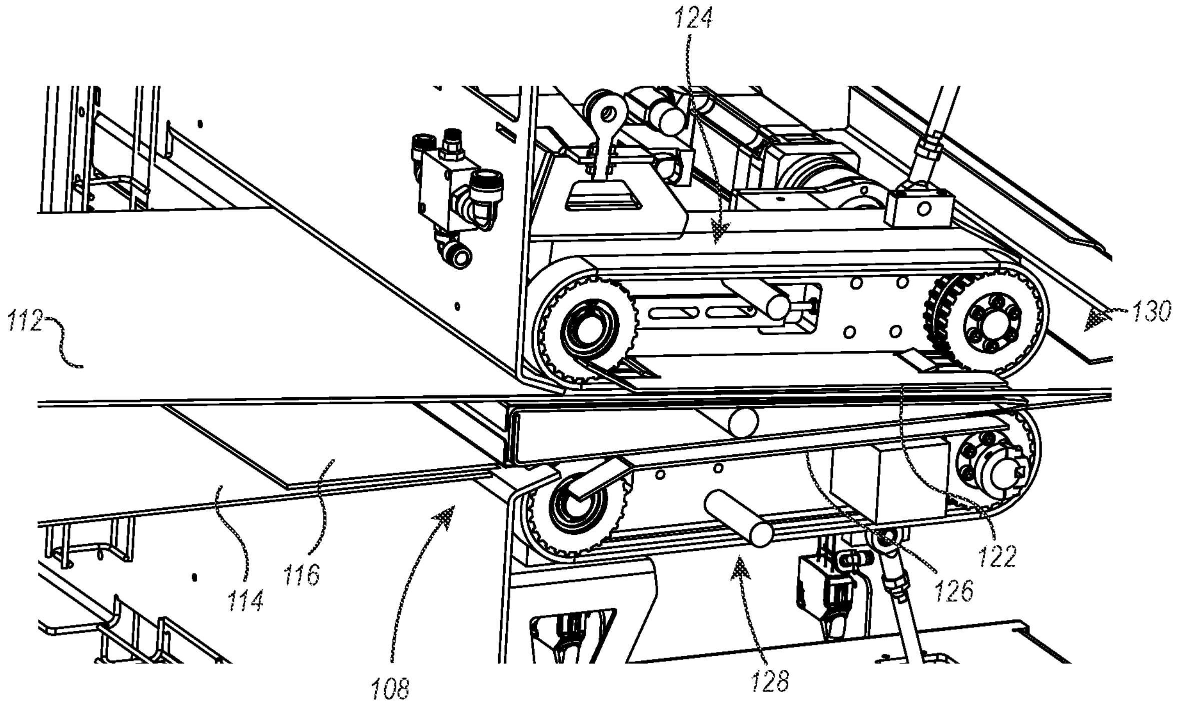
Figure 5:
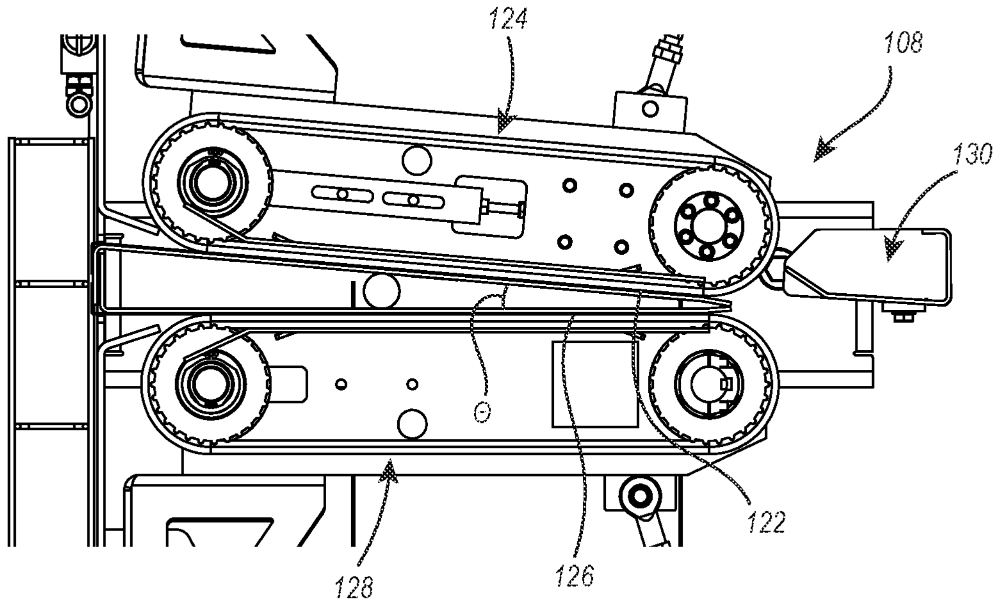

The infeed mechanism 108 is illustrated in FIGS. 3-5. In some embodiments, such as that shown in FIG. 3, the infeed mechanism 108 includes a first track 110 that guides a first feed 112 of sheet material 104 into a first end of the package machine 100 and a second track 114 the guides a second feed 116 of sheet material 104 into the first end of the package machine 100. The first track 110 and the second track 114 may each include a generally planar surface upon which the respective feeds of sheet material can be advanced. Additionally, the first track 110 and the second track 114 can include guides 118, 120 that help the first and second feeds 112, 116 of sheet material 104 to lay generally flat upon the planar surface of the respective track 110, 114. In some embodiments, the guides 118, 120 can pivot and can include one or more wheels that engage the first and second feeds 112, 116 of sheet material 104.

As best seen in FIGS. 4 and 5, the infeed mechanism 108 also includes a first low friction surface 122 and associated first advancement mechanism 124. The first low friction surface 122 is generally aligned with the planar surface of track 110. The first advancement mechanism 124 is positioned and configured to engage and advance the first feed 112 of sheet material 104 along the first low friction surface 122. More specifically, the first advancement mechanism 124 may comprise one or more feed rollers, pulleys, and/or belts that can rotate and engage the first feed 112. The first advancement mechanism 124 may be spaced apart from the first low friction surface 122 a distance that is equal to or less than the thickness of the first feed 112. The first low friction surface 122 acts as a support plate for the first feed 112. Engagement of the first advancement mechanism 124 with the first feed 112 causes the first feed 112 to advance along the first low friction surface 122 and into the packaging machine 100.

The infeed mechanism 108 also includes a second low friction surface 126 and associated second advancement mechanism 128. The second low friction surface 126 is generally aligned with the planar surface of track 114. The second advancement mechanism 128 is positioned and configured to engage and advance the second feed 116 of sheet material 104 along the second low friction surface 126. More specifically, the second advancement mechanism 128 may comprise one or more rollers, pulleys and/or belts that can rotate and engage the second feed 116. The second advancement mechanism 128 may be spaced apart from the second low friction surface 126 a distance that is equal to or less than the thickness of the second feed 116. The second low friction surface 126 acts as a support plate for the second feed 116. Engagement of the second advancement mechanism 128 with the second feed 116 causes the second feed 116 to advance along the second low friction surface 126 and into the packaging machine 100.

In some embodiments, the first and second advancement mechanisms 124, 128 are activated independent from one another. For instance, either the first advancement mechanism 124 can be activated to advance the first feed 112 into the packaging machine 100, or the second advancement mechanism 128 can be activated to advance the second feed 112 into the packaging machine 100. In such an embodiment, sheet material 104 from only one of the first feed 112 and the second feed 116 is advanced into the packaging machine 100 at a time. This allows for a desired type of sheet material 104 (e.g., size, thickness, color, strength, etc.) to be selected and advanced into the packaging machine 100 as needed.

As can be seen in FIG. 5, the first low friction surface 122 and the second low friction surface 126 form an acute angle $\ominus$ with one another. In the illustrated embodiment, the vertex of the angle $\ominus$ is formed by second ends of the first and second low friction surfaces 122, 126. First ends of the first and second low friction surfaces 122, 126 are disposed closer to a first end of the packaging machine 100 where the sheet material 104 enters the packaging machine 100 and the second ends thereof are disposed closer to an opposing second end of the packaging machine 100. The angle $\ominus$ is small enough to enable the sheet material 104 to be advanced into the packaging machine 100 without creating any folds or creases in the sheet material 104. For instance, in some embodiments the angle $\ominus$ is less than about 15°, 12.5°, 10°, 7.5°, 5°, 3°, or 2°. The relatively small angle $\ominus$ orients the sheet material 104 so that as the sheet material 104 advances into tracks 130 of the packaging machine 100, the sheet material 104 does not bend enough to create an undesirable fold or crease therein. Additionally, the relatively small angle $\ominus$ allows for either feed 112, 116 of the sheet material 104 to be advanced into the packaging machine 100 without requiring adjustment, repositioning, or reorientation of the infeed mechanism 108.

While the first and second low friction surfaces 122, 126 form the angle ⊖, the specific configuration of how the angle ⊖ is formed can vary from one embodiment to the next. For instance, in the illustrated embodiment the second low friction surface 126 is generally parallel with horizontal and/or a feeding direction of the sheet material 104 through the packaging machine 100, while the first low friction surface 122 is angled up from the second low friction surface 126 (and horizontal and/or the feeding direction of the sheet material 104 through the packaging machine 100). In other words, the first end of the first low friction surface 122 is spaced further from the second low friction surface 126 than the second end of the first low friction surface 122.

In other embodiments, however, the first low friction surface 122 may be generally parallel with horizontal and/or the feeding direction of the sheet material 104 through the packaging machine 100 and the second low friction surface 126 may be angled down from the first low friction surface 122 (and horizontal and/or the feeding direction of the sheet material 104 through the packaging machine 100). In still other embodiments, the first and second low friction surfaces 122, 126 may both be angled relative to horizontal and/or the feeding direction of the sheet material 104 through the packaging machine 100. For instance, the first low friction surface 122 may be angled up from horizontal and/or the feeding direction of the sheet material 104 through the packaging machine 100 and the second low friction surface may be angled down from horizontal and/or the feeding direction of the sheet material 104 through the packaging machine 100.

In some instances, the first and second low friction surfaces 122, 126 may be angled away from horizontal and/or the feeding direction of the sheet material 104 through the packaging machine 100 by an equal and opposite amount (e.g., +2.5° and−2.5°). In other instances, the first and second low friction surfaces 122, 126 may be angled away from horizontal and/or the feeding direction of the sheet material 104 through the packaging machine 100 by different amounts (e.g., +3.5° and −1.5°).

In still other embodiments, the first and second low friction surfaces 122, 126 may be oriented generally parallel to one another. In such a case, the first and second low friction surfaces 122, 126 may be spaced apart by a small enough distance to enable the sheet material to be advanced into the packaging machine without creating any folds or creases in the sheet material and with limited or no repositioning of the infeed mechanism. In some cases, the first and second low friction surfaces 122, 126 may be spaced apart by a distance of about 4 inches or less, about 3 inches or less, about 2.5 inches or less, about 2 inches or less, about 1.5 inches or less, about 1 inch or less, about 0.75 inches or less, about 0.5 inches or less, about 0.25 inches or less, about 0.1 inches or less.

It will be appreciated that other aspects of the first and second low friction surfaces 122, 126 can vary from one embodiment to the next. For instance, in the illustrated embodiment, the first and second low friction surfaces 122, 126 are formed of distinct components that are connected together or positioned adjacent to one another. In other embodiments, however, a single component may be formed with the first and second low friction surfaces 122, 126 disposed on opposing sides thereof.

Regardless of the specific orientations of the first and second low friction surfaces 122, 126, the first and second advancement mechanisms 124, 128 may be oriented so as to engage the first and second feeds 112, 116, respectively, to advance the first and second feeds 112, 116 along the first and second low friction surfaces 122, 126. For instance, as shown in FIGS. 4 and 5, the orientation of the first advancement mechanism 124 generally corresponds to the orientation of the first low friction surface 122 and the orientation of the second advancement mechanism 128 generally corresponds to the orientation of the second low friction surface 126.

Furthermore, as can be seen in the Figures, the first advancement mechanism 124 is positioned above the first low friction surface 122. Additionally, the second low friction surface 126 is positioned below the first low friction surface 122. As a result, the second low friction surface 126 and the first advancement mechanism 124 are positioned on opposite sides of the first low friction surface 122. Similarly, the second advancement mechanism 128 is positioned below the second low friction surface 126. As a result, the second advancement mechanism 128 and the first low friction surface 122 are positioned on opposite sides of the second low friction surface 126.

Separation Mechanism

Once the sheet material 104 is advanced into the packaging machine 100, the sheet material 104 needs to be cut or separated into lengths that can be used to form individual packaging templates. Rolling knives are typically used for cutting the sheet material. One advantage to rolling knives is their reliability. However, a disadvantage of rolling knives is that the cutting speed is relatively slow because the rolling knives have to move across the sheet material to make the cuts. Because of the relatively low cutting speed of rolling knives, the throughput of packaging machines incorporating them is lower than desired.

Figure 6:
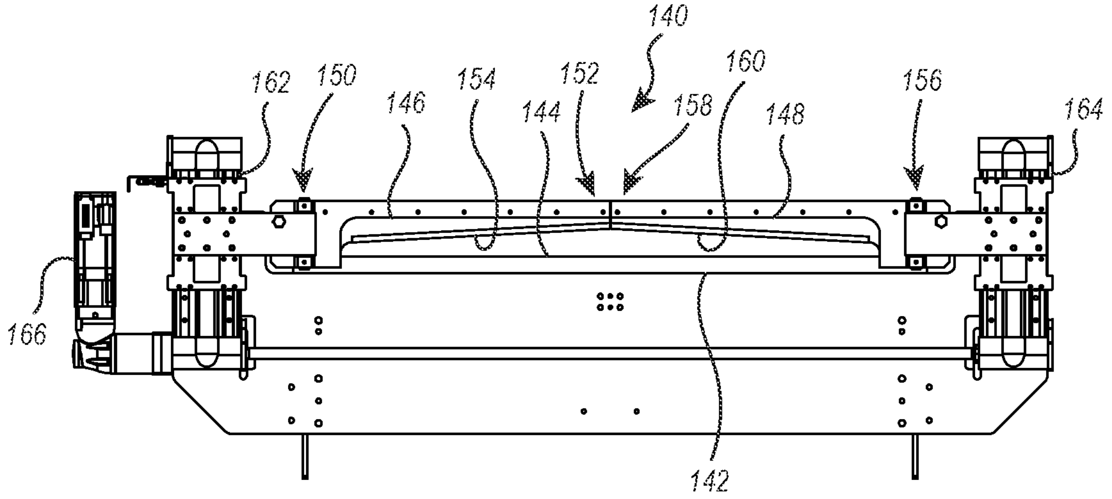
FIGS. 6 and 7 illustrates elevational and top views of a separation mechanism of the packaging machine of FIG. 2.
Figure 7:
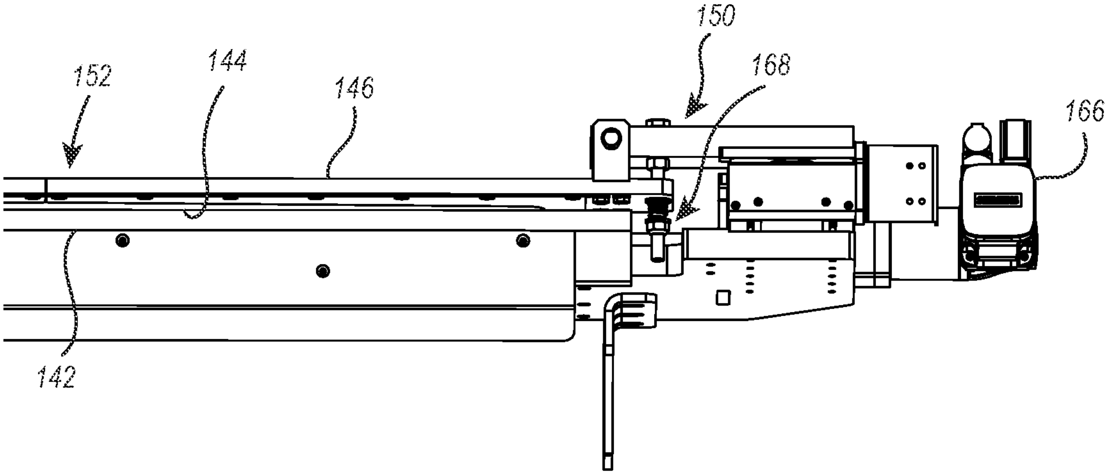

FIGS. 6 and 7 illustrate elevational and top views of a separation mechanism 140 that can be used to separate the sheet material 104 into lengths for packaging templates. The separation mechanism 140 includes knives that cut the sheet material 104 through an upward and downward cutting movement. As used herein, "upward and downward cutting movement" is not limited to movements within a vertical plane. Rather, "upward and downward cutting movement" generally refers to the knives moving towards and away from the sheet material 104 in order to create a cut therein. Thus, movement of the knives through diagonal and/or horizontal planes can be considered upward and downward cutting movements so long as the knives are moving towards and away from the sheet material 104 being cut. Upward and downward cutting movements of the knives is also referred to herein as moving the knives between non-activated and activated positions.

An upward and downward cutting movement is advantageous because it is easily controllable. Another advantage is that one up and down cutting movement can be very short and less time consuming compared to rolling knives. Furthermore, the upward and downward cutting movement is performed relative to a cutting table. The cutting table is an element that serves as support for the sheet material while the knives cut the sheet material. As a result, the sheet material will not undesirably move during the cutting movement of the knives. The cutting table also serves as the counter knife of the knives. This means that the cutting table can exert a counterforce to the force that the knives exert on the sheet material. As a result, the sheet material will not move with the downward movement of the knives.

With more specific reference to FIG. 6, the separation mechanism 140 is illustrated in an elevational view. As can be seen, the separation mechanism 140 includes a cutting table 142. The cutting table 142 has a top surface that supports the sheet material 104 after the sheet material is advanced past the infeed mechanism 108. The cutting table 142 also includes a cutting edge 144, which as discussed in further detail below helps facilitate cutting of the sheet material 104.

The separation mechanism 140 also includes first and second knives 146, 148. The first knife 146 has a mounted end 150, a free end 152, and a first knife edge 154 extending at least partially therebtween. Similarly, the second knife 148 has a mounted end 156, a free end 158, and a second knife edge 160 extending at least partially therebtween. The free ends 152, 158 of the first and second knives 146, 148 are positioned adjacent to one another above the sheet material 104. For instance, in some embodiments, the free ends 152, 158 of the first and second knives 146, 148 are spaced apart by less than 1.0 inches, 0.75 inches, 0.5 inches, 0.25 inches, or 0.1 inches. Furthermore, in some embodiments, the free ends 152, 158 are disposed generally above the center of the sheet material 104. The mounted ends 150, 156 of the first and second knives 146, 148 are positioned adjacent to opposing sides of the sheet material 104.

The mounted ends 150, 156 of the first and second knives 146, 148 are connected to tracks 162, 164, respectively. The connections between the mounted ends 150, 156 and the tracks 162, 164 are movable to enable the first and second knives 146, 148 to be raised and lowered or moved towards and away from the sheet material 104. Additionally, the first and second knives 146, 148 are associated with one or more actuators 166 (e.g., motor, spring, cylinder, etc.) to move the knives 146, 148 between the raised and lowered positions. In some embodiments, the one or more actuators 166 associated with the knives 146, 148 simultaneously move the first and second knives 146, 148 between the non-activated and activated positions. In other embodiments, the one or more actuators 166 may be enabled to move the first and second knives 146, 148 independently between the non-activated and activated positions.

The cutting edge 144 of the cutting table 142 and the first and second knives 146, 148 may be configured to cooperate to cut the sheet material 104. For instance, the first and second knives 146, 148 may be sized, shaped, positioned, and/or oriented relative to the cutting edge 144 to enable the cutting edge 144 and the first and second knife edges 154, 160 to efficiently cut the sheet material 104 when the first and second knives 146, 148 are moved from the non-activated position to the activated position.

By way of example, the first and second knife edges 154, 160 may each be angled relative to the cutting edge 144 of the cutting table 142 to create a contact point between the first knife edge 154 and the cutting edge 144 and between the second knife edge 160 and the cutting edge 144. More specifically, the cutting edge 144 of the cutting table 142 lies within a plane and the first and second knife edges 154, 160 may be angled towards and/or across the plane of the cutting edge 144. In some embodiments, the first knife edge 154 is angled relative to the cutting edge 144 of the cutting table 142 such that the mounted end 150 of the first knife 146 is disposed on a first side of the plane and the free end 152 of the first knife 146 is disposed on a second side of the plane. Similarly, the second knife edge 160 may be angled relative to the cutting edge 144 of the cutting table 142 such that the mounted end 156 of the second knife 148 is disposed on the first side of the plane and the free end 158 is disposed on the second side of the plane.

In some embodiments, the separation mechanism 140 includes a biasing member associated with each of the first and second knives 146, 148 to bias or maintain the first and second knives 146, 148 against the cutting edge 144. For instance, FIG. 7 illustrates a top view of the first knife 146. As can be seen, the mounted end 150 of the first knife 146 may mounted (pivotally or at an angle) so that the first knife 146 is angled towards the cutting edge 144. Additionally, a biasing member 168 applies a force to the first knife 146 to ensure that the first knife 146 contacts the cutting edge 144 with sufficient force so that the first knife 146 and the cutting edge 144 can cut the sheet material 104. Furthermore, the biasing member 168 ensures that the single moving contact point between the first knife edge 154 and the cutting edge 144 is consistent even when the edges are not all perfectly straight. As a result, the biasing member 168 reduces the need for expensive tolerances in the components. The second knife 148 can include a similar biasing member. The biasing members may include springs, cylinders, motors, etc.

In addition to the first and second knives 146, 148 being angled towards the cutting edge 144 (e.g., the free ends 152, 158 being disposed closer to the cutting edge 144 than the mounted ends 150, 156), the first and second knives can also taper from the mounted ends 150, 156 toward the free ends 152, 158, such that the first and second knife edges 154, 160 are angled in two directions relative to the cutting edge 144 of the cutting table 142. For instance, the first knife edge 154 has a first end adjacent to the mounted end 150 and a second end adjacent to the free end 152, and the second end is disposed vertically higher than the first end. In other words, the first knife 146 has a non-cutting edge opposite to the first knife edge 154 and the second end of the first knife edge 154 is positioned closer to the non-cutting edge than the first end of the first knife edge 154. Similarly, the second knife edge 160 has a first end adjacent to the mounted end 156 and a second end adjacent to the free end 158, and the second end is disposed vertically higher (or closer to a non-cutting edge) than the first end.

As a result of the angled configurations of the first and second knives 146, 148, the contact points between the first knife edge 154 and the cutting edge 144 and between the second knife edge 160 and the cutting edge 144 move across the cutting edge 144 as the first and second knives are moved between the non-activated and activated positions. Because the first and second knife edges 154, 160 are configured as essentially mirror images of one another, when the contact point between the first knife edge 154 and the cutting edge 144 moves across the cutting edge 144 in a first direction, the contact point between the second knife edge 160 and the cutting edge 144 moves across the cutting edge 144 in a second direction that is opposite to the first direction. Nevertheless, it will be appreciated that the first and second knives may not be mirror images of one another. In such cases, the contact points may move is the same direction when the first and second knives are moved between the non-activated and activated positions.

Creasing Mechanisms

As the sheet material 104 advances through the packaging machine 100, various cuts and creases are formed in the sheet material 104 in order to transform the sheet material into packaging templates, such as packaging template 10 shown in FIG. 1. One challenge with making packaging templates, such as packaging template 10, is forming the transverse creases between the panels A, B, C, and D. Typically, a creasing tool is moved transversely across the sheet material to form the creases. Similar to the rolling knives discussed above, moving a creasing tool transversely across the sheet material can be relatively slow, thereby reducing the throughput of the packaging machine. Additionally, transversely moving creasing tools require the sheet material to be stationary when forming the creases, otherwise the creases would be formed at angles or the creasing tools would have to be able to move both transversely and longitudinally to crease transverse creases.

Figure 8:
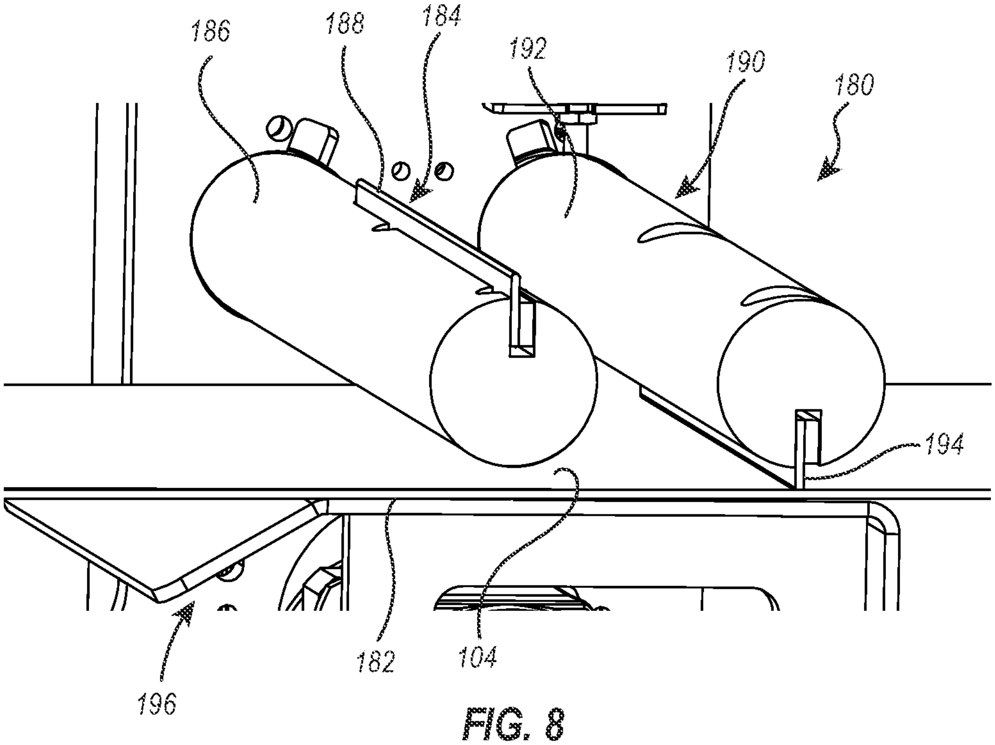
FIG. 8 illustrates a dual roller creasing mechanism of the packaging machine of FIG. 2.

FIG. 8 illustrates a creasing system 180 that can be used to form transverse creases in the sheet material 104 in a consistent and rapid manner. The creasing system 180 includes a support plate 182 that supports the sheet material 104 as the sheet material moves through the packaging machines 100. The creasing system 180 also includes a first creasing roller 184 that is oriented across the sheet material 104 and transverse to the length of the sheet material 104. The first creasing roller 184 has a body 186 with a predetermined diameter. In the illustrated embodiment, the body 186 is cylindrical, but the body 186 could have other shapes. A first creasing ridge 188 extends radially from the cylindrical body 186. The first creasing ridge 188 may be integrally formed with the cylindrical body 186 or may include an insert that is attached to the body 186 or received within a recess in the body 186 and extends therefrom.

The first creasing roller 184 is configured to rotate about its axis to engage the first creasing ridge 188 with the sheet material 104 to form a crease in the sheet material 104. The support plate 182 provides a counter pressure to the first creasing roller 184 to enable the first creasing ridge 188 to form a crease in the sheet material 104.

The distance between the support plate 182 and the outer surface of the cylindrical body 186 may be about the same as or greater than the thickness of the sheet material 104. As a result, when the first creasing roller 184 is rotated so the first creasing ridge 188 is not oriented towards the sheet material 104 (as shown in FIG. 8), the sheet material 104 can move between the first creasing roller 184 and the support plate 182 without any creases being formed therein.

In contrast, when the outer radial surface of the first creasing ridge 188 is oriented towards the support plate 182, the distance therebetween is less than the thickness of the sheet material 104. As a result, the sheet material 104 can be positioned between the first creasing roller 184 and the support plate 182 without being significantly affected until the first creasing roller 184 is rotated so the first creasing ridge 188 is oriented towards the support plate 182. When the first creasing roller 184 is rotated so the first creasing ridge 188 is oriented towards the support plate 182, the first creasing ridge 188 will engage the sheet material 104 and the sheet material 104 will be compressed between the first creasing ridge 188 and the support plate 182, thereby forming a crease in the sheet material 104.

In some embodiments, the creasing system 180 also includes a second creasing roller 190 that can be substantially similar to the first creasing roller 184. For instance, the second creasing roller can include a body 192 and a second creasing ridge 194. The second creasing ridge 194 may be integrally formed with the body 192 or may include an insert that attached to the body 192 or received within a recess in the body 192 and extends therefrom. The second creasing roller 190 can be configured to rotate to engage the second creasing ridge 194 with the sheet material 104 to form a crease in the sheet material 104, as shown in FIG. 8. In still other embodiments, the creasing system 180 may include three or more creasing rollers.

In embodiments that include two or more creasing rollers 184, 190, at least the first and second creasing rollers 184, 190 may be positioned adjacent to one another. For instance, the first and second creasing rollers 184, 190 may be spaced apart (in the feeding direction of the sheet material) by less than 24 inches, less than 18 inches, less than 12 inches, less than or 6 inches, or the like. The relatively close spacing of the first and second creasing rollers 184, 190 can limit the size of the creasing system 180 as well as allow for creases to be formed close together in the sheet material 104.

The first and second creasing rollers 184, 190 (or additional creasing rollers) may be operated in a variety of ways. For instance, the first and second creasing rollers 184, 190 may be operated independent from one another. By way of example, the first creasing roller 184 may be rotated to form a crease in the sheet material 104 while the second creasing roller 190 remains disengaged from the sheet material 104, or vice versa. Alternatively, the first and second creasing rollers 184, 190 may be configured to simultaneously engage the sheet material 104 to simultaneously form multiple creases therein. In still other embodiments, the first and second creasing rollers 184, 190 may be configured to alternatingly engage the sheet material 104 to form creases therein. By alternating between the first and second creasing rollers 184, 190, the rate at which the transverse creases can be formed in the sheet material 104 can be significantly increased.

In some embodiments, the creasing system 180 or the packaging machine 100 includes a feeding mechanism 196 that is configured to feed the sheet material 104 through the packaging machine 100. The creasing system 180 can be configured to form creases in the sheet material 104 while the sheet material 104 is moving through the packaging machine 100. In other words, the sheet material 104 does not have to stop moving through the packaging machine 100 in order to allow for the transverse creases to be formed. Rather, the creasing roller(s) can rotate into engagement with the sheet material 104 to form creases therein while the sheet material 104 continues to move through the packaging machine 100 (via the feeding mechanism 196).

Cutting Mechanisms

Figure 9:
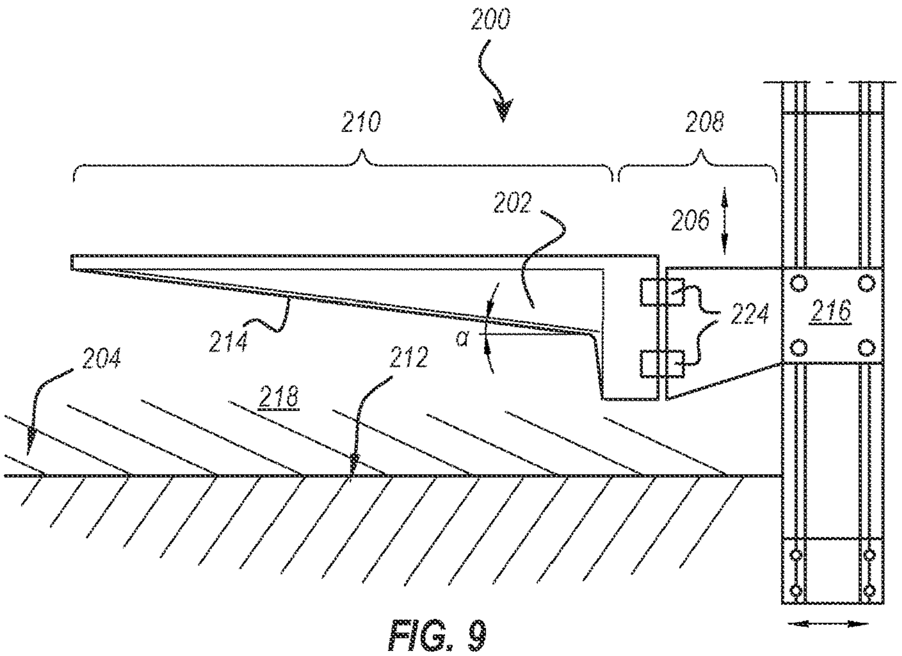
FIG. 9 illustrates a side view of an example cutting unit according to an embodiment of the present disclosure.
Figure 10:
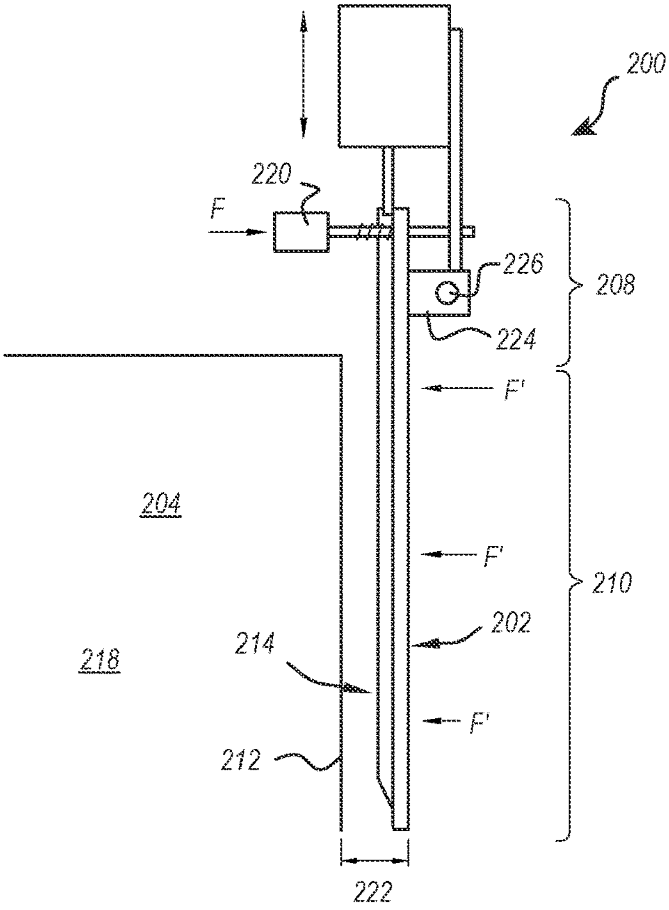
FIG. 10 illustrates a top view of the cutting unit of FIG. 9.

As noted above, in addition to making creases in the sheet material 104, cuts can be formed in the sheet material 104 in order to make box templates, such as box template 10. For instance, cuts may be formed in the sheet material 104 in order to separate adjacent flaps from one another. FIGS. 9 and 10 illustrate elevation and top views, respectively, of a cutting unit 200 that may be used to form cuts in the sheet material 104.

In the illustrated embodiment, the cutting unit 200 includes a blade 202 and a cutting table 204. The blade 202 may be a guillotine type blade. For instance, the blade 202 may perform an up and downward movement 206, also known as a falling movement. The construction of the blade 202 may be relatively simple. For instance, the blade 202 may be a straight guillotine blade. The blade 202 may include one or more parts, including, for instance, a mounting segment 208 and cutting segment 210.

The blade 202 may be manufactured from a metal or from stainless steel. Alternatively, the blade can also be made from a ceramic material or another hard, sharp material.

The cutting table 204 can serve as counter-blade to the blade 202, serving for a good operation of the cutting unit. The cutting table 204 may be straight along a cutting edge 212, whereby the blade 202 is able to slide with a cutting edge 214 thereof along the cutting edge 212 of the cutting table 204. The blade 202 may be placed for this purpose at an angle $\alpha$ relative to the cutting table. The angle $\alpha$ introduces a contact point between the cutting edge 212 of the cutting table 204 and a cutting edge 214 of the blade 202. This cutting point can be identified and is formed by the contact point between the first and the second cutting edges 212, 214. The contact point is only visible when the cutting edges 212, 214 intersect. This happens during each cutting movement 206. This means that the blade 202 and the cutting table 204 are positioned or placed such that an angle α is formed between the first and the second cutting edges 212, 214. The effective cutting of the sheet material 104 takes place at the position of the contact point. Another name for the contact point is the cutting point. This effective cutting can be explained with reference to FIG. 9.

FIG. 9 shows the blade 202 in a position above the cutting table 204. This is why there is no contact point yet in FIG. 9. The blade 202 and the cutting table 204 lie too far apart, so that the cutting edges 212, 214 do not intersect. When the blade 202 of FIG. 9 is moved downward by actuator 216, a contact point will result at a determined moment during the cutting movement. In FIG. 9 this contact point results on the right-hand side of the blade 202. Alternatively, in another embodiment, it is possible for this to occur on the left-hand side of the blade. This is for instance possible by having the blade incline from the other side. This contact point, or cutting point, moves during each movement 206 of the blade 202. This means that the position of the contact point moves over the cutting edge 212 of cutting table 204 over a determined distance during the cutting movement 206. In FIG. 9, this displacement of the contact point goes from the right to the left. This displacement of the contact point is a function of the position of the blade 202. In the case that the blade 202 is a straight blade, this displacement is directly proportional to the position of the blade 202.

The cutting table 204 may be flat along an upper side 218, whereby the sheet material 104 can advance over this flat upper side 218. This upper side 218 may be smooth so that the sheet material 104 can advance without appreciable resistance. Alternatively, the cutting table 204 may take the form of a blade with a sharp edge, which is provided at a distance from a sliding surface (not shown). This sliding surface fulfils the function of supporting the sheet material 104, similarly to the flat upper side 218 of the cutting table 204 in FIG. 9. The blade with the sharp edge serves as counter-blade to the blade. The sharp edge of the blade servers here as cutting edge 212. The blade is controlled by an actuator 216. This actuator 216 ensures that the blade 202 is able to perform an up and downward cutting movement 206 relative to the cutting table 204. This cutting movement 206 may be a linear movement. The actuator can for instance be a pneumatic or an electromechanical actuator. The movement of the actuator 216 may be a linear movement in the up and downward direction 206.

FIG. 10 shows a pressure element 220 which is provided to exert a force F on the blade 202. More particularly, this force is directed such that a pressure between the first and the second cutting edges 212, 214 can be increased. As a result, the distance 222 between the blade 202 and the cutting table 204 is reduced. FIG. 10 further shows that the pressure element 220 is placed at a distance from a hinge element 224. This pressure is thereby increased by having the hinge element 224 exert a counter-force to the force F, wherein a torque F' is induced. This torque F' ensures the contact between the first and the second cutting edge 212, 214 at a contact point, which coincides with the cutting point. More particularly, because the blade 202 is pushed against the cutting table 204, it will increase the pressure on the contact point between the cutting table 204 and the blade 202.

The hinge element 224 can be hinged round an upward axis 226 so that the blade 202 can be rotated so that it lies closer against or further from the cutting table 204. In other words, a distance 222 between the blade 202 and the cutting table 204 is adjustable. This may be important for a good operation of the cutting unit. When the blade 202 performs a downward movement 206 close to the cutting table 204, the cutting table 204 will serve more effectively as a counter-blade.

In an alternative embodiment, which is not shown, a pressure element can be embodied as a torque spring in the hinge element 224. As a further alternative, pressure element can be embodied as a pneumatic cylinder or a spring.

During use, the blade 202 moves relative to the cutting edge 212, whereby the sheet material 104 is cut at the position the cutting edge 214 contacts the cutting edge 212 of the cutting table 204. The blade 202 may lie at an angle α so that the cutting edges 212, 214 of the blade 202 and the cutting table 204 come into contact only over a minimal area, this contact area being related to the cutting point. The effect of pressure element 220 relates to this contact area. Due to the cutting movement 206, the blade 202 undergoes undesired effects such as vibration and bending. This contact area can be ensured by having the pressure element 220 press on the blade 202.

From the foregoing, it will be appreciated that the cutting mechanisms shown in FIGS. 9 and 10 may be similar or identical to the separation mechanism 140 of FIGS. 6 and 7, or vice versa. For instance, the configuration of the blades, cutting table, operation, functions, etc. from the embodiments may be similar or identical to one another. Likewise, aspects shown or described in connection with one embodiment may be incorporated into the other embodiment.

Figure 11:
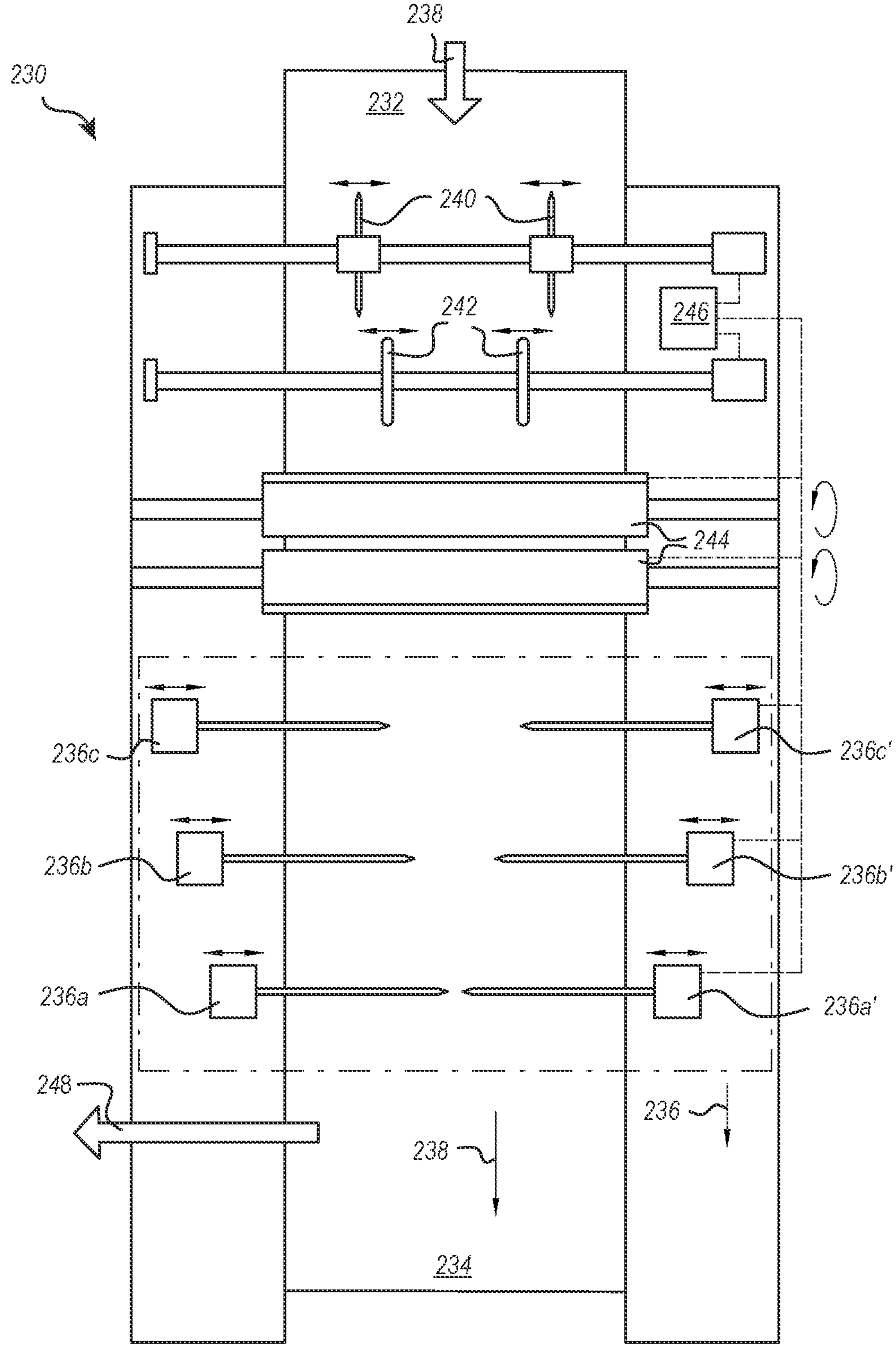
FIG. 11 illustrates an example device with a cutting unit, supply and a controller according to an embodiment of the present disclosure.

FIG. 11 shows a schematic top view of a converting assembly 230 that may be incorporated into the packaging machine 100 for converting sheet material 104 into box templates. The converting assembly 230 of FIG. 11 has an inlet 232, shown at the top of the Figure and an outlet 234 shown at the bottom of the figure. At the position of the inlet 232, the sheet material 104 is supplied as a continuous length. At the outlet 234, a resulting box template exits the converting assembly 230.

The converting assembly 230 is configured to partition a continuous length of the sheet material 104 which enters the converting assembly 230 via inlet 232, wherein each segment is provided to create a box template. The converting assembly 230 is further configured to provide each segment with cuts, for instance for creating the side flaps in the box template, and for providing creases (e.g., to define panels thereof). It will be apparent that the continuous length can be supplied via inlet 232 in continuous manner, i.e. the speed at which the sheet material 104 enters is substantially constant, or in discontinuous manner, i.e. the speed at which sheet material 104 enters is not constant. When the sheet material 104 is supplied in a discontinuous manner, the sheet material 104 can, for instance, be stopped regularly. These stops of the sheet material 104 may be synchronized with one or more cutting units 236. The cutting units 236 can then make an incision in the sheet material 104 while the sheet material 104 is stationary. This allows the cutting units 236 to be given a fixed position, as seen in the direction of movement 238 of the converting assembly 230. When the sheet material 104 is supplied continuously, the cutting units 236 may be placed on a slide which can make a cutting unit 236 move synchronously with the sheet material 104 in the direction of movement 238 during cutting. Using such slides, it is possible to cut the sheet material 104 while stationary and to make a plurality of cuts at different longitudinal positions of the sheet material 104. Because the relative position of the cutting unit 236 and the sheet material 104 is relevant, combinations of the above will also be possible, and it is possible to work with one or more cutting units 236.

The converting assembly 230 may also include the following components: longitudinal blades 240, longitudinal creasing wheels 242, transverse creasing rollers 244 (which may be similar or identical to the creasing system 180 discussed above), and cutting units 236. It will be apparent that the order of these different components can be changed in different ways without having an adverse effect on the essential operation of the machine. The cutting units 236 can here, for instance, be provided at inlet 232 in order to cut the continuous length of sheet material 104 into segments, after which the different segments are further processed individually. Discharge 248 may be placed downstream of a cutting unit 236 which is provided to cut the continuous length of sheet material 104 into segments. This is further elucidated below.

The longitudinal blades 240 may be formed as discs having peripheral edges which are formed as blades for cutting the sheet material 104. The discs may be placed on a shaft extending transversely over the sheet material 104. The discs may be displaceable in the transverse direction. The discs may be displaceable in the transverse direction by means of an actuator and the transverse position of the discs may be adjustable by a controller 246. This allows different segments of the sheet material 104 to be cut to different widths. This makes it possible to manufacture box templates of different widths one after the other using the converting assembly 230. Alternatively, the longitudinal blades 240 can be placed on several transverse shafts.

Similar to the longitudinal blades 240, the longitudinal creasing wheels 242 may be placed on a transverse shaft. The longitudinal creasing wheels 242 may also be positioned in the transverse direction via an actuator, wherein the position is controlled by the controller 246. This allows the longitudinal creases in successive segments to be formed at different transverse positions. Successive box templates can hereby have different fold lines.

Two transverse creasing rollers 244 may be arranged adjacently of each other, as seen in the direction of movement. The transverse creasing rollers 244 may take a substantially identical form and may be individually controllable by the controller 246. Each transverse creasing roller 244 may take the form of a cylindrical body with a predetermined diameter. Provided on the cylindrical body is a protrusion extending over substantially the whole length of the cylindrical body. This protrusion is provided to make an impression in the sheet material 104 by means of the protrusion when the sheet material 104 passes under the creasing roller 244 and when the cylindrical body rotates. Provided for this purpose under the creasing rollers 244 is a counterpressure element, which may take the form of a plate. The distance between the plate and the cylindrical surface is here equal to or greater than the thickness of the sheet material 104, and the distance between the top of the protrusion on the cylindrical surface and the plate, when the protrusion is at its position closest to the plate, is smaller than the thickness of the sheet material 104. The sheet material 104 will thus be able to pass under the creasing roller 244 without being significantly affected thereby, until the protrusion is rotated so as to realize an impression in the cardboard.

It will also be understood how a transverse creasing roller 244 can be controlled to form a transverse crease in the sheet material 104 at a predetermined position. Because two transverse creasing rollers 244 are provided, two transverse creases can be provided close to each other in the cardboard without the throughfeed of the sheet material 104 through the converting assembly 230 having to be slowed down. It will be appreciated that when two transverse creases have to be provided close to each other in the sheet material 104 and only one transverse creasing roller 244 were to be provided, throughfeed of the sheet material 104 would have to be stopped in order to give the one transverse creasing roller 244 time to perform a full rotation so as to be able to rotate the protrusion up to the sheet material 104 once again. Two transverse creasing rollers 244 provide a solution to this slowing down, allowing the throughfeed to be high.

In some embodiments, the converting assembly includes a plurality of cutting units 236*a*, 236*a*', 236*b*, 236*b*', 236*c*, 236*c*'. This plurality of cutting units 236*a*, 236*a*', 236*b*, 236*b*', 236*c*, 236*c*' may be positioned two by two adjacently of each other, as seen in the direction of movement. This plurality of cutting units 236*a*, 236*a*', 236*b*, 236*b*', 236*c*, 236*c*' may be connected to the controller 246. A good co-action of the different cutting units can thus be guaranteed. As a result, the plurality of cutting units 236*a*, 236*a*', 236*b*, 236*b*', 236*c*, 236*c*' can make several cuts in the sheet material 104 substantially simultaneously by having the plurality of cutting units 236*a*, 236*a*', 236*b*, 236*b*', 236*c*, 236*c*' perform a cutting movement 206 substantially simultaneously. The sheet material 104 can advance when the plurality of cutting units 236*a*, 236*a*', 236*b*, 236*b*', 236*c*, 236*c*' are in a position as shown in FIG. 9. This position is the position when no cutting movement is being performed.

False Crease Removal

When a large number of box templates have to be formed, a machine, system, or devices as described herein may be employed for making the box templates. A supply of sheet material may supply the sheet material used to form the box templates. The sheet material is typically supplied continuously or almost continuously. For this purpose, the sheet material can be supplied on a roll. Alternatively, a continuous length of sheet material can be supplied, wherein the continuous length is folded in zigzag manner, such that the continuous length is formed by a succession of straight layers of the sheet material. From the supply, the sheet material can be feed into a cutting device, where the sheet material is cut into a plurality of segments and each segment is further processed for form a box template.

Irregularity in the continuous length of sheet material can have potentially adverse effects on the quality of the box templates and/or the boxes formed therefrom. When the continuous length is supplied as a succession of layers of sheet material which are folded in zigzag manner and lie in a stack, each fold in the stack will form a so-called false crease in the sheet material. A false crease is a crease which, although present in the sheet material, was not arranged as a folding aid in folding of the sheet material or box template for the purpose of forming a box. Tests have shown that a false crease at an unfortunate position in the box template has the potential to disrupt the whole folding process of the box at that position on the box template. This can cause problems in the further processing of the box templates. By detecting the irregularity and transmitting a position of the irregularity to the controller which controls the cutting device, a discharge cycle can be activated. The discharge cycle can cut a waste segment from the continuous length and discharge it. This discharge cycle ensures that the irregularity does not find its way into the box template, or at least does not come to lie in a predetermined problem zone of the box template. This is further elucidated below.

Another irregularity can relate to a succession of two lengths of sheet material. The continuous length of sheet material is not supplied in infinitely long form. The continuous length of sheet material is supplied on a roll or in a stack. In practice, the end of the roll or the end of the stack can be connected to the start of a new roll or a new stack. At the position of this connection, the continuous length of sheet material has other properties which could be undesirable in a box template. At the least, these other properties could cause problems in predetermined problem zones in the box templates, whereby the box templates can no longer be folded in an optimal manner. By activating the discharge cycle, irregularities of different types can be cut out of the sheet material and discharged.

Figure 12:
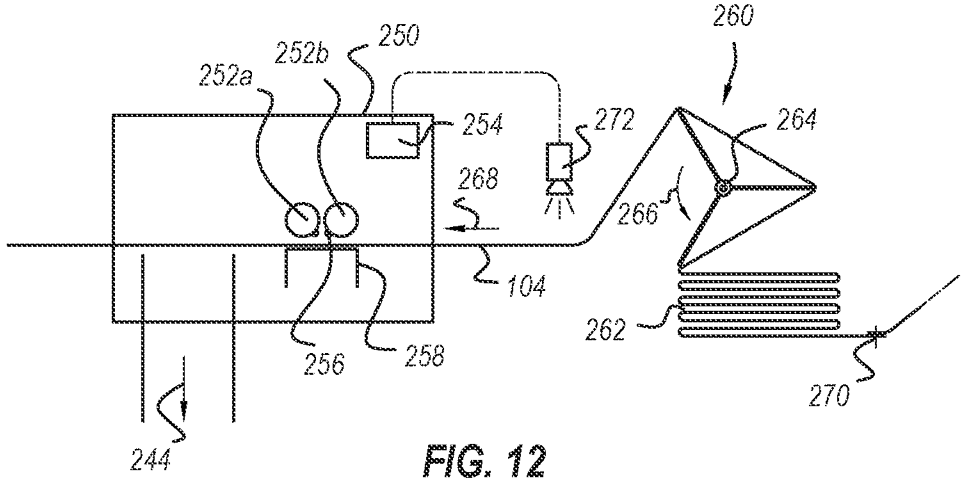
FIG. 12 illustrates schematic of an example device for forming box templates according to an embodiment of the present disclosure.

FIG. 12 shows a schematic side view of a cutting device 250, which may be similar or identical to the other devices disclosed herein. FIG. 12 shows only transverse creasing rollers 252*a* and 252*b* and the controller 254 of cutting device 250. The transverse creasing rollers 252*a* and 252*b* each comprise a protrusion 256. The transverse creasing rollers 252*a* and 252*b* are further each arranged above a pressure plate 258 as described above. As alternative to the embodiment of FIG. 12, a separate pressure plate 258 can be provided for each creasing roller 252*a* and 252*b*. As further alternative, a counter-roller (not shown) can be provided instead of a pressure plate 258. The counter-roller can then be driven synchronously with the creasing roller so that the sheet material can move through the rollers. The advantage of a transverse creasing roller 252*a*, 252*b* in combination with a counter-roller is that when protrusion 256 passes at the sheet material, the counter-roller performs the same forward movement on an underside of the sheet material as the transverse creasing roller. The resistance against forward movement will thereby not increase. When a pressure plate 258 is provided, the slide resistance at the position of the underside of the sheet material may increase temporarily when protrusion 256 presses against pressure plate 258. With a counter-roller, the pressure between the rollers and on the sheet material is increased, but no resistance against forward movement is created.

FIG. 12 further shows the supply 260 for supplying the continuous length of sheet material. In the embodiment of FIG. 12, the continuous length of sheet material is formed into a stack 262. In the stack 262, a plurality of straight sheets or layers of sheet material are connected to each other in zigzag manner to form a continuous length. The advantage of a stack of sheet material is that the stack can be transported more efficiently than a roll, because the stack takes up a beam-shaped space and can thereby be placed and handled more easily and efficiently. A further advantage is that the sheets in the stack are straight in all directions and thus do not have any curves. An alternative to the stack is a roll of sheet material. A roll is however more difficult to handle and less efficient to store. In the case of a roll, the sheet material will further have a curve, which is necessary to form the roll. It will further not be possible to supply all types of sheet material on a roll. A further alternative is to manufacture the sheet material at the location of the supply.

A drawback of a stack 262 is that the sheet material is folded through 180 degrees between adjacent sheets of the continuous length. This creates a crease. At the position of this crease the cardboard will always tend to fold easily in future use. When this crease finds its way into a box template at a location where a fold is undesired in further processing of the sheet material, this crease is referred to as a false crease. In some circumstances a false crease can form a problem in forming of the box.

For the sake of completeness, FIG. 12 shows in principle an unwinding aid 264 for unwinding of stack 262. Unwinding aid 264 is provided to rotate (in the direction of arrow 266) such that the continuous length of sheet material is supplied to inlet 268 of cutting device 250 by the rotation. The unwinding aid 264 can take a variety of different forms, including, for instance, that of a statically bent guide plate.

FIG. 12 further shows a connection 270 between the end of stack 262 and the beginning of a further stack (not shown). Such a connection 270 can also be problematic in further processing of the cardboard. In some embodiments, the connections 270 and fold lines between adjacent sheets of stack 262 are deemed irregularities.

FIG. 12 further shows a sensor 272 for detecting the irregularities. Sensor 272 is illustrated in FIG. 12 as a non-contact sensor. In some embodiments, the sensor may be a camera. It will be apparent that a contact sensor can also be provided for detecting irregularities. The present disclosure is therefore not limited to a non-contact sensor. In FIG. 12, the sensor is placed between supply 260 and cutting device 250. Alternatively, sensor 272 can be positioned at an inlet 268 of cutting device 250. As further alternative, the sensor 272 can be integrated in supply 260.

Sensor 272 is operatively connected to controller 254. Controller 254 receives an input from sensor 272 when sensor 272 detects an irregularity in the sheet material. Controller 254 may also control the feed speed of the sheet material at the position of the inlet of cutting device 250. Because the position of sensor 272 is known and the feed speed of the sheet material may be adjusted by controller 254, the position of the irregularity, detected by sensor 272, may also be known. More particularly, controller 254 can project where the irregularity would come to lie in the successive segments which are made by cutting device 250. This allows controller 254 to initialize a discharge cycle when the irregularity is judged to be potentially problematic. The controller may be provided with logic which makes it possible to judge when an irregularity, projected onto a segment or onto a box template, is potentially problematic. A presetting may be, for instance, possible where a false crease is projected to be situated less than a predetermined distance (e.g., 2 cm) from a desired crease. In such a case, the false crease may be considered problematic. Alternatively, and/or additionally, controller 254 can be programmed to judge that when the false crease is situated in the B-segment of the box template 10, the false crease is problematic. The controller can detect a problem situation on the basis of the projection of the false crease onto the segments and/or onto the box templates to be created. When the controller detects a problem situation, the waste cycle is initialized.

In this context, it is elucidated that controller 254 can control cutting device 250 to make box template 10, wherein successive box templates 10 can have different dimensions. The different dimensions are related to goods which have to be packaged in the box formed by the corresponding box template. Controller 254 gathers information about the goods to be packaged, including the dimensions thereof, and makes corresponding box templates 10. Controller 254 may include a memory in which specifications of a plurality of box templates to be created are comprised during use of cutting device 250. This knowledge allows the irregularity to be projected and makes it possible to determine when a waste segment will be discharged. The waste segment is typically formed by a piece of the length of sheet material lying between two successive segments. By removing a waste segment, the otherwise successive segments will be separated from each other by a distance equal to the length of the piece of the sheet material which is cut out as a waste segment and discharged.

The size of the waste segment can be determined in different ways. For instance, a minimum size can be provided in order to facilitate handling of the waste segment. In some embodiments, handling an extremely narrow strip in cutting device 250 may be difficult. In any event, the size of the waste segment can be determined such that the irregularity will be situated in the waste segment. Alternatively, the size of the waste segment can be determined on the basis of the projection, with the object of ensuring that the false crease comes to lie in the segment outside a problem zone. In such a configuration, the amount of waste will be smaller, but the algorithms in the controller will be more complex. Discharging the waste segment can ensure that irregularities do not have an adverse effect on the further processing of box templates 10 by a folding machine or other processing.

Figure 13:
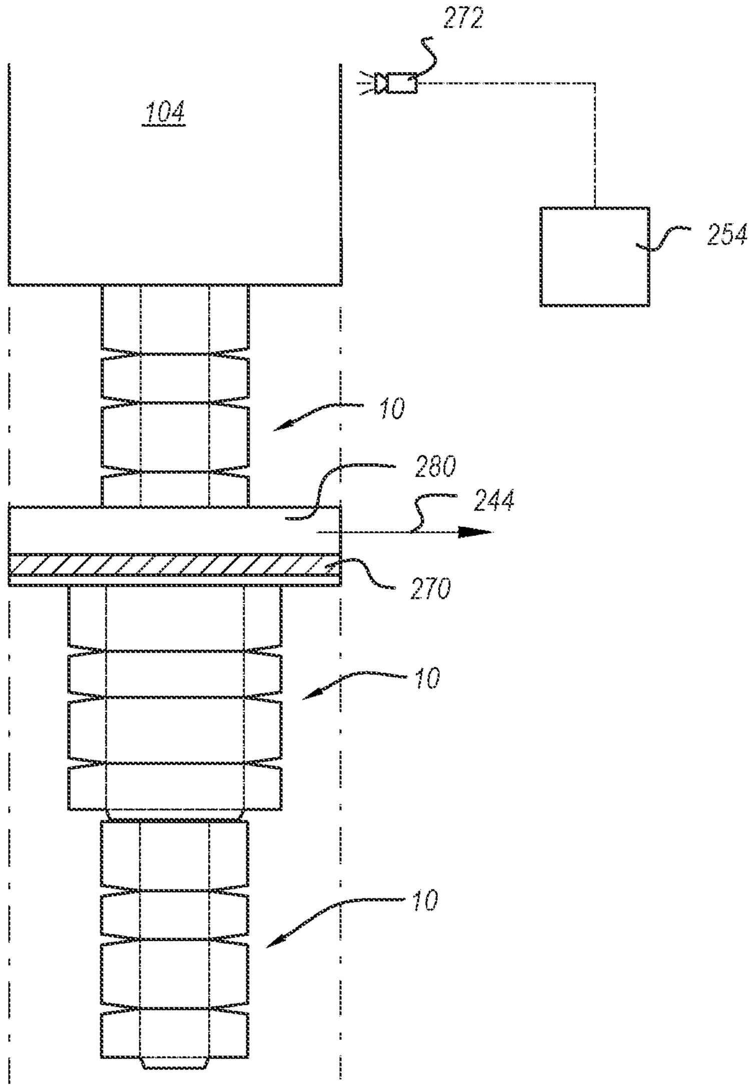
FIG. 13 is a top view of the device of FIG. 12.

FIG. 13 shows a top view of the system of FIG. 12. FIG. 13 shows that sensor 272 is operatively connected to controller 254. The Figure further illustrates that box templates 10 can be made from the continuous length of sheet material 104. This process is controlled by controller 254, wherein controller 254 knows the specifications, i.e. the location of the cuts, the dimensions and the location of the creases, and controls the elements of cutting device 250. FIG. 13 illustrates that successive segments of the continuous length of sheet material can form successive box templates 10. FIG. 13 further illustrates a waste segment 280 which is situated between two box templates 10. In the embodiment of FIG. 13, the waste segment 280 comprises a connection 270 which is elucidated above with reference to FIG. 12. FIG. 13 illustrates that waste segment 280 can be discharged 244. On the basis of the above description and on the basis of the shown figures, it will be appreciated that discharging of a waste segment 280 of a predetermined size has the result that box templates 10 can be created more optimally. More optimally is defined as without false creases in predetermined zones of the box template 10.

In order to facilitate discharging of waste segment 280, waste segment 280 itself can in some situations also be partitioned so that a plurality of waste segments 280 are in fact removed one after the other.

In light of the disclosure herein, embodiments may take a variety of forms or may include a variety of different combinations of the features described herein. By way of example, a packaging machine used to convert generally rigid sheet material into packaging templates for assembly into boxes or other packaging may include:

- an infeed mechanism that directs a first feed of the sheet material and a second feed of the sheet material into the packaging machine, the infeed mechanism comprising:
  - a first low friction surface and an associated first advancement mechanism, the first advancement mechanism being configured to engage and advance the first feed of the sheet material along the first low friction surface and into the packaging machine; and
  - a second low friction surface and an associated second advancement mechanism, the second advancement mechanism being configured to engage and advance the second feed of the sheet material along the second low friction surface and into the packaging machine,
  - the first low friction surface and the second low friction surface either being parallel opposing sides of a thin plate, or forming an acute angle, the thin plate or acute angle being configured to enable the sheet material to be advanced into the packaging machine without creating any folds or creases in the sheet material and with limited or no repositioning of the infeed mechanism; and
- one or more converting tools configured to perform one or more conversion functions on the sheet material as the sheet material moves through the packaging machine, the one or more conversion functions being selected from the group consisting of creasing, bending, folding, perforating, cutting, and scoring, to create the packaging templates.

In some embodiments, the first low friction surface and the second low friction surface are formed separate from one another. In other embodiments, the first low friction surface and the second low friction surface are formed on opposing sides of an integral component.

In some embodiments, the first advancement mechanism comprises one or more feed rollers, belts, or bands that move the first feed of the sheet material into the packaging machine. Similarly, in some embodiments, the second advancement mechanism comprises one or more feed rollers, belts or bands that move the second feed of the sheet material into the packaging machine.

In some embodiments, the first advancement mechanism is positioned above or to one side of the first low friction surface. In some embodiments, the second low friction surface is positioned below or to a second side of the first low friction surface, such that the second low friction surface and the first advancement mechanism are positioned on opposite sides of the first low friction surface. In some embodiments, the second advancement mechanism is positioned below or to a side of the second low friction surface, such that the second advancement mechanism and the first low friction surface are positioned on opposite sides of the second low friction surface. In some embodiments, the first low friction surface and the second low friction surface form an acute angle of about 5 degrees. In some embodiments, the second low friction surface is oriented generally parallel to a feeding direction of the sheet material through the packaging machine and the first low friction surface is angled up from the second low friction surface. In some embodiments, the first low friction surface is angled above or to one side of a feeding direction of the sheet material through the packaging machine to form an acute angle with the feeding direction of the sheet material through the packaging machine and the second low friction surface is angled below or to a second side of the feeding direction of the sheet material through the packaging machine to form an acute angle with the feeding direction of the sheet material through the packaging machine.

In another embodiment, a packaging machine used to convert generally rigid sheet material into packaging templates for assembly into boxes or other packaging includes:

- a separation system that separates the sheet material into lengths for use in creating the packaging templates, the separation system comprising:
  - a cutting table having a cutting edge;
  - a first knife with a mounted end, a free end, and a first knife edge extending at least partially therebetween, the first knife edge being angled relative to the cutting edge of the cutting table to create a single and moving contact point between the first knife edge and the cutting edge of the cutting table when the first knife is moved between a non-activated position to an activated position; and a second knife with a mounted end, a free end, and a second knife edge extending at least partially therebtween, the second knife edge being angled relative to the cutting edge of the cutting table to create a single and moving contact point between the second knife edge and the cutting edge of the cutting table when the second knife is moved between a non-activated position to an activated position, the free ends of the first and second knives being positioned adjacent to one another such that both of the free ends can pass through the sheet material when the first and second knives are moved to the activated positions, and the mounted ends of the first and second knives being positioned on opposing sides of the sheet material.

In some embodiments, the cutting edge of the cutting table lies within a plane. In some embodiments, the first knife edge is angled relative to the cutting edge of the cutting table such that the mounted end of the first knife is disposed on a first side of the plane and the free end is disposed on a second side of the plane. In some embodiments, the second knife edge is angled relative to the cutting edge of the cutting table such that the mounted end of the second knife is disposed on the first side of the plane and the free end is disposed on the second side of the plane.

In some embodiments, the packaging machine also includes a biasing member that is configured to bias the first knife against the cutting edge of the cutting table. The biasing member can comprise a spring. In some embodiments, the packaging machine also includes a biasing member that is configured to bias the second knife against the cutting edge of the cutting table. The biasing member can comprise a spring.

In some embodiments, the first knife tapers from the mounted end toward the free end, such that the first knife edge is angled relative to the cutting edge of the cutting table. In some embodiments, the first knife has a non-cutting surface opposite the first knife edge, and the first knife edge having a first end adjacent to the mounted end of the first knife and a second end adjacent to the free end of the first knife, the second end being disposed closer to the non-cutting surface than the first end.

In some embodiments, the second knife tapers from the mounted end toward the free end, such that the second knife edge is angled relative to the cutting edge of the cutting table. In some embodiments, the second knife has a non-cutting surface opposite the second knife edge, and the second knife edge having a first end adjacent to the mounted end of the second knife and a second end adjacent to the free end of the second knife, the second end being disposed closer to the non-cutting surface than the first end.

In some embodiments, the contact point between the first knife edge and the cutting edge of the cutting table moves across the cutting edge as the first knife is moved between the non-activated and activated positions. Similarly, in some embodiments, the contact point between the second knife edge and the cutting edge of the cutting table moves across the cutting edge as the second knife is moved between the non-activated and activated positions. In some embodiments, when the contact point between the first knife edge and the cutting edge moves across the cutting edge in a first direction, the contact point between the second knife edge and the cutting edge moves across the cutting edge in a second direction that is opposite to the first direction.

In some embodiments, the first knife is connected to a first actuator that is configured to move the first knife between the non-activated and activated positions. Similarly, in some embodiments, the second knife is connected to a second actuator that is configured to move the second knife between the non-activated and activated positions. In some embodiments, the first and second actuators are synchronized to simultaneously move the first and second knives between the non-activated and activated positions. In some embodiments, the first and second actuators are independently operable to enable the first and second knives to be independently moved between the non-activated and activated positions.

In some embodiments, the free ends of the first and second knives are spaced apart by less than 1.0 inches, 0.75 inches, 0.5 inches, 0.25 inches, or 0.1 inches.

In another embodiment, a packaging machine used to convert generally rigid sheet material into packaging templates for assembly into boxes or other packaging includes:

a creasing system that forms transverse creases in the sheet material, the transverse creases being oriented across the sheet material and transverse to the length of the sheet material, the creasing system comprising:

a support plate that supports the sheet material; and a first creasing roller that is oriented across the sheet material and transverse to the length of the sheet material, the first creasing roller having a first creasing ridge extending radially therefrom, the first creasing roller being configured to rotate to engage the first creasing ridge with the sheet material to form a crease in the sheet material.

In some embodiments, the packaging machine also includes a second creasing roller that is oriented across the sheet material and transverse to the length of the sheet material, the second creasing roller having a second creasing ridge extending radially therefrom, the second creasing roller being configured to rotate to engage the second creasing ridge with the sheet material to form a crease in the sheet material.

In some embodiments, the first and second creasing rollers are positioned adjacent to one another and are independently operable. In some embodiments, the first and second creasing rollers are spaced apart by less than 24 inches, less than 18 inches, less than 12 inches, less than or 6 inches. In some embodiments, the first creasing ridge comprises an insert that is received within a recess in the first creasing roller and extends therefrom. In some embodiments, the second creasing ridge comprises an insert that is received within a recess in the second creasing roller and extends therefrom. In some embodiments, the first and second creasing rollers are configured to alternatingly engage the sheet material to form creases therein. In some embodiments, the first and second creasing rollers are configured to simultaneously engage the sheet material to simultaneously form multiple creases therein.

In some embodiments, the packaging machine also includes a feeding mechanism that is configured to feed the sheet material through the packaging machine, the creasing system being configured to form creases in the sheet material while the sheet material is moving through the packaging machine. In some embodiments, the first creasing roller and the support plate are disposed on opposite sides of the sheet material. In some embodiments, the first creasing roller compresses the sheet material towards the support plate when the first creasing roller is rotated to engage the first creasing ridge with the sheet material to form a crease in the sheet material. In some embodiments, the second creasing roller and the support plate are disposed on opposite sides of the sheet material. In some embodiments, the second creasing roller compresses the sheet material towards the support plate when the second creasing roller is rotated to engage the second creasing ridge with the sheet material to form a crease in the sheet material.

In another embodiment, a cutting unit for cutting sheet material includes:

a cutting table with a first cutting edge;

a blade with a second cutting edge;

a first actuator mounted between the cutting table and the blade, the first actuator being configured to move the blade relative to the cutting table in a cutting movement, the first and the second cutting edges lying at an angle so that a contact point can be identified between the first and the second cutting edges during the cutting movement; and a pressure element provided to exert a force on the blade to increase a pressure between the first cutting edge and the second cutting edge at the position of the contact point.

In some embodiments, the blade has a cutting segment which comprises the second cutting edge and the blade has a mounting segment for mounting on the first actuator. In some embodiments, the blade is mounted on the first actuator via a hinge element which can be hinged round an axis. In some embodiments, the hinge element is mounted at a distance from the pressure element and is configured to provide a counter-force to the force, such that the counter-force induces a torque round the axis. In some embodiments, the first actuator is a linear actuator.

In another embodiment, a system for making box templates includes:

a supply of sheet material;

a cutting device; and a controller, wherein:

the supply is provided for supplying the sheet material to the cutting device;

the cutting device comprises at least one cutting unit according to any one of the foregoing claims, the cutting device being configured to make a cut in the sheet material on the basis of inputs from the controller; and the cutting device comprises a feed line for advancing the cardboard in a feed direction.

In some embodiments, the at least one cutting unit comprises a second actuator movable in a transverse direction relative to the feed line so that a position of the at least one cutting unit can be adjusted in the transverse direction. In some embodiments, the at least one cutting unit comprises at least two cutting units positioned on either side of the feed line, so that the sheet material can be cut on both sides. In some embodiments, the at least two cutting units are positioned so that their first cutting edges lie on a straight line. In some embodiments, the at least two cutting units can be positioned in the transverse direction so that the blades are positioned close to each other.

In another embodiment, a method is provided for cutting sheet material with a cutting unit that includes a cutting table with a first cutting edge and a blade with a second cutting edge, the first cutting edge and the second cutting edge lying at an angle. The method includes:

moving the blade relative to the cutting table in a generally linear cutting movement by way of a first actuator; and pressing on the blade by way of a pressure element during the cutting movement in order to increase a pressure between the first cutting edge and the second cutting edge at the position of a contact point.

In some embodiments, the method also includes supplying the sheet material to a cutting device by way of a feed line, the cutting device comprising the cutting unit; and positioning the blade in a transverse direction relative to the feed line by means of a second actuator so that a position of the at least one cutting unit is adjustable in the transverse direction.

In some embodiments, the cutting device comprises at least two cutting units positioned on either side of the feed line so that the sheet material can be cut on both sides. In some embodiments, the at least two cutting units can be positioned so that their first cutting edges lie on a straight line. In some embodiments, the at least two cutting units can be positioned such that the blades are positioned close to each other during the cutting movement to enable cutting the sheet material into two separate pieces.

In another embodiment, a device for making box templates from a continuous length of sheet material includes:

a supply of sheet material;

a cutting device;

a controller; and a sensor, wherein:

the supply is provided to supply the continuous length of sheet material to the cutting device;

the cutting device is provided to cut the continuous length of sheet material into successive segments on the basis of input from the controller in order to make the box templates;

the sensor is configured to detect an irregularity in the continuous length of sheet material and to transmit a position of the irregularity to the controller; and the controller is provided to activate a discharge cycle in the cutting device on the basis of the position of a waste segment in the continuous length of sheet material, the discharge cycle being configured to cause the waste segment to be cut from the continuous length and discharged.

In some embodiments, the waste segment comprises the irregularity. In some embodiments, the controller is configured to project the irregularity onto the successive segments on the basis of the position in order to determine a location of the irregularity in one of the successive segments, wherein the controller is provided to activate the discharge cycle when the location is situated within a predetermined zone. In some embodiments, the controller activates the discharge cycle for the purpose of discharging a waste segment for the one of the successive segments, wherein the waste segment has a size which suffices at least to move the location out of the predetermined zone. In some embodiments, the irregularity is one or more of a false crease and a seam between successive lengths of sheet material.

In some embodiments, the device further comprises a feed line for advancing the sheet material in a direction of movement, and wherein the cutting device comprises one or more blades for cutting the sheet material into successive segments and for forming scores in the segments in order to make the box templates. In some embodiments, the plurality of blades comprise transverse blades configured to make cuts in the sheet material in a direction transversely of the direction of movement, and comprise longitudinal blades configured to make cuts in the sheet material in the direction of movement.

In some embodiments, the cutting device further comprises creasing mechanisms for forming creases in the box templates. In some embodiments, the creasing mechanisms comprise at least two creasing rollers extending transversely of the direction of movement and positioned adjacently of each other, such that two transverse creases can be formed simultaneously with a distance between the transverse creases corresponding to the distance between the creasing rollers.

In another embodiment, a method for creating box templates from a continuous length of sheet material includes:

supplying the continuous length of sheet material to a cutting device;

cutting the continuous length of sheet material into successive segments with the cutting device on the basis of an input from a controller in order to make the box templates;

detecting an irregularity at a position in the continuous length of sheet material via a sensor and transmitting the position to the controller; and activating a discharge cycle in the cutting device on the basis of the position of the irregularity, the discharge cycle including cutting a waste segment out of the continuous length; and discharging the waste segment from the cutting device.

In some embodiments, the method also includes:

projecting the position of the irregularity onto the successive segments in order to determine a location of the irregularity in one of the successive segments; and wherein activating the discharge cycle is performed only when the location of the irregularity is projected to lie within a predetermined zone of the one of the successive segments.

In some embodiments, projecting the position of the irregularity further comprises determining a distance between the location and a border of the predetermined zone, and of transmitting the distance to the controller. In some embodiments, the discharge cycle is configured to cut a waste segment with a length of at least the distance from the continuous length. In some embodiments, the method also includes forming transverse creases in the box templates by driving two transverse creasing rollers which are positioned adjacently of each other so that two transverse creases can be formed substantially simultaneously by the synchronized driving of the two transverse creasing rollers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A cutting unit for cutting sheet material, the cutting unit comprising:

a cutting table with a first cutting edge;

a blade with a second cutting edge;

a first actuator mounted between the cutting table and the blade, the first actuator being configured to move the blade relative to the cutting table in a cutting movement, the first and the second cutting edges lying at an angle so that a contact point can be identified between the first and the second cutting edges during the cutting movement; and a pressure element provided to exert a force on the blade to increase a pressure between the first cutting edge and the second cutting edge at the position of the contact point.

2. The cutting unit according to claim 1, wherein:

the blade has a cutting segment which comprises the second cutting edge; and the blade has a mounting segment for mounting on the first actuator.

3. The cutting unit according to claim 1, wherein the blade is mounted on the first actuator via a hinge element which can be hinged round an axis.

4. The cutting unit according to claim 3, wherein the hinge element is mounted at a distance from the pressure element and is configured to provide a counter-force to the force, such that the counter-force induces a torque round the axis.

5. The cutting unit according to claim 1, wherein the first actuator is a linear actuator.

6. A system for making box templates, the system comprising a supply of sheet material;

a cutting device; and a controller, wherein:

the supply is provided for supplying the sheet material to the cutting device;

the cutting device comprises at least one cutting unit according to claim 1, the cutting device being configured to make a cut in the sheet material on the basis of inputs from the controller; and the cutting device comprises a feed line for advancing the cardboard in a feed direction.

7. The system according to claim 6, wherein the at least one cutting unit comprises a second actuator movable in a transverse direction relative to the feed line so that a position of the at least one cutting unit can be adjusted in the transverse direction.

8. The system according to claim 6, wherein the at least one cutting unit comprises at least two cutting units positioned on either side of the feed line, so that the sheet material can be cut on both sides.

9. The device according to claim 8, wherein the at least two cutting units are positioned so that their first cutting edges lie on a straight line.

10. The device according to any of claim 7, wherein the at least two cutting units can be positioned in the transverse direction so that the blades are positioned close to each other.

11. A method for cutting sheet material with a cutting unit that includes a cutting table with a first cutting edge and a blade with a second cutting edge, the first cutting edge and the second cutting edge lying at an angle, the method comprising:

moving the blade relative to the cutting table in a generally linear cutting movement by way of a first actuator; and pressing on the blade by way of a pressure element during the cutting movement in order to increase a pressure between the first cutting edge and the second cutting edge at the position of a contact point.

12. The method according to claim 11, further comprising:

supplying the sheet material to a cutting device by way of a feed line, the cutting device comprising the cutting unit; and positioning the blade in a transverse direction relative to the feed line by means of a second actuator so that a position of the at least one cutting unit is adjustable in the transverse direction.

13. The method according to claim 12, wherein the cutting device comprises at least two cutting units positioned on either side of the feed line so that the sheet material can be cut on both sides.

14. The method according to claim 13, wherein the at least two cutting units can be positioned so that their first cutting edges lie on a straight line.

15. The method according to claim 13, wherein the at least two cutting units can be positioned such that the blades are positioned close to each other during the cutting movement to enable cutting the sheet material into two separate pieces.

16. A system for making box templates, the system comprising an infeed system configured to individually advance sheet materials from at least two supplies of sheet material;

a separation unit configured to cut the sheet materials into desired lengths;

one or more longitudinal blades that are selectively movable in a transverse direction to be able to make longitudinal cuts at different transverse locations on the sheet materials;

one or more longitudinal creasing wheels that are selectively movable in a transverse direction to be able to make longitudinal creases at different transverse locations on the sheet materials;

first and second creasing rollers extending transversely to extend transversely across the sheet materials, the first and second creasing rollers being configured to rotate to form transverse creases in the sheet materials; and one or more sets of cutting units configured to form transverse cuts in the sheet materials, each set of cutting units comprising a first cutting unit and a second cutting unit, the first and second cutting units being disposed on opposite sides of the sheet material and extending at least partially thereover.

17. The system of claim 16, further comprising a control system configured to control the operation of the components of the system.

18. The system of claim 17, wherein the control system is configured to coordinate the operations of the components of the system.

* * * * *